United States Patent Office 3,293,285
Patented Dec. 20, 1966

3,293,285
16-FORMAL AND 16-HYDROXYMETHYL-D-NOR-STEROIDS AND DERIVATIVES
Eugene P. Oliveto, Glen Ridge, and Hans Reimann, Wayne, N.J., assignors to Schering Corporation, Bloomfield, N.J., a corporation of New Jersey
No Drawing. Filed June 3, 1965, Ser. No. 461,174
20 Claims. (Cl. 260—488)

This application is a continuation-in-part of copending application Serial No. 263,409 of Eugene P. Oliveto and Hans Reimann, filed March 7, 1963, now abandoned.

This invention relates to a new class of steroidal derivatives, to methods for their manufacture, and to novel intermediates produced thereby. More specifically this invention relates to therapeutically useful 16-hydroxymethyl-D-nor-steroids and 16-formyl-D-nor-steroids, and to intermediates useful in the preparation thereof. Specifically, this invention relates to 16-hydroxymethyl-D-nor-4-androstene-3-ones, 16-hydroxymethyl-D-nor-5-androstene-3-ones, 16-formyl-D-nor-4-androstene-3-ones, 16-formyl-D-nor-5-androstene-3-ones, the 1-dehydro- and 19-nor analogs thereof, to 16-hydroxymethyl-D-nor-19-nor-5(10)-androstene-3-ones, 16-formyl-D-nor-19-nor-5(10)-androstene-3-ones, and to intermediates useful in the manufacture thereof.

Included among the compounds of our invention are 16-hydroxymethyl- and 16-formyl-D-nor-androstenes of the group consisting of steroids of the following formulae: Ia, Ib, II, III, and IV:

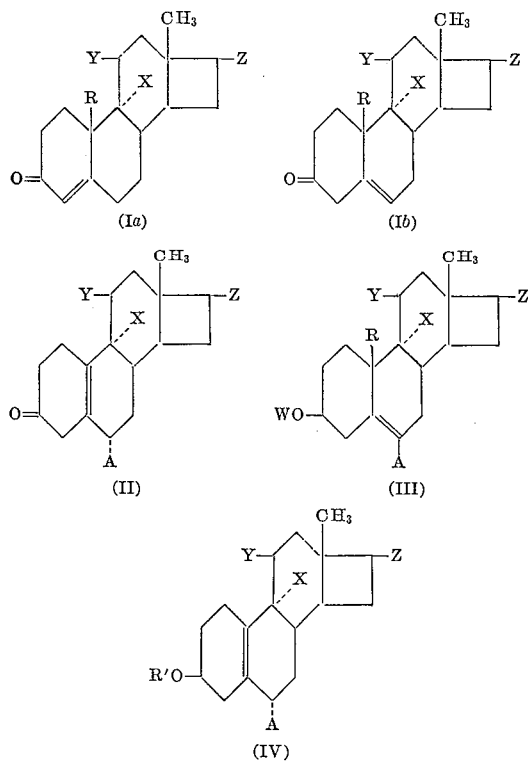

wherein A is a member of the group consisting of H, lower alkyl (preferably methyl), and halogen (preferably fluorine); R and R' are members selected from the group consisting of H and methyl; W is a member selected from the group consisting of H and an acyl radical of a hydrocarbon carboxylic acid having up to 8 carbon atoms; X is a member of the group consisting of H and halogen; Y is a member of the group consisting of hydrogen, halogen, hydroxy, alkanoyloxy, and keto, and when Y is hydrogen, X is hydrogen, and when Y is halogen, X is halogen; and together, X and Y are members of the group consisting of $9\beta,11\beta$-oxido and an additional bond; and Z is a member of the group consisting of —CH$_2$OW$^1$ and —CHO, W$^1$ being a member of the group consisting of H and an acyl radical of a carboxylic acid having up to 8 carbon atoms; and including the 2-dehydro analogs of Formula IV, and when R is methyl, the 1-dehydro analogs of the D-nor-steroids of Formula I. Also included in our invention are the 3-ketal derivatives of the D-nor-steroids of Formulae I and II and when Z is —CHO, the di-lower alkyl acetals of the compounds of Formulae I and III.

Representative of the ester groups contemplated by the term "acid radicals of hydrocarbon carboxylic acids having up to 8 carbon atoms" are radicals of lower alkanoic acids such as formic, acetic, propionic, and butyric; radicals of aromatic carboxylic acids such as benzoic and toluic acids; and radicals of dicarboxylic acids such as maleic, succinic, and phthalic acids. Also included are the alkaline earth and alkali metal salts of esters of dibasic acids; e.g. a sodium salt of a hemisuccinate.

By lower alkyl is contemplated hydrocarbon residues having up to 4 carbon atoms, thus including methyl, ethyl, n-propyl, isopropyl, n-butyl, sec-butyl, and tertiary butyl.

Representative of the 16-hydroxymethyl-D-nor-androstenes and 16-formyl-D-nor-androstenes of Formulae Ia and II are compounds such as 16-hydroxymethyl-D-nor-4-androstene-3-one, the 1-dehydro analog thereof, and the 16-acetate and 16-benzoate esters thereof, 16-hydroxymethyl-D-nor-19-nor-4-androstene-3-one, and the 16-hemisuccinate ester thereof; $6\alpha$-fluoro-16-hydroxymethyl-D-nor-4-androstene-3-one, $6\alpha$-methyl-16-hydroxymethyl-D-nor-4-androstene-3-one; $9\alpha,11\beta$-dichloro-16-hydroxymethyl - D-nor-4-androstene-3-one, $9\alpha$-fluoro-$11\beta$-hydroxy-16-hydroxymethyl-D-nor-4-androstene-3-one, $9\alpha$-bromo-$11\beta$-hydroxy - 16 - hydroxymethyl-D-nor-1,4-androstadiene-3-one, $9\alpha$ - fluoro-16-hydroxymethyl-D-nor-4-androstene-3, 11 - dione, 16-hydroxymethyl-D-nor-4,9(11)-androstadiene-3-one, and $9\beta,11\beta$-epoxy-16-hydroxymethyl-D-nor-4-androstene-3-one as well as the 16-formyl-D-nor-steroids corresponding to the aforenamed 16-hydroxymethyl compounds.

Also included in our invention are 3-keto-$\Delta^5$-D-nor steroids of Formula Ib, such as 16-hydroxymethyl-D-nor-5-androstene-3-one and 16-formyl-D-nor-5-androstene-3-one and the 1-dehydro- and 19-nor analogs thereof, as well as the 3-keto-$\Delta^{5(10)}$-D-nor-steroids of Formula II exemplified by 16 - hydroxymethyl-D-nor-19-nor-5(10)-androstene-3-one and 16-formyl-D-nor-19-nor-5(10)androstene-3-one.

Representative of the 16-hydroxymethyl- and 16-formyl-D-nor-4-androstene intermediates of Formula III are compounds such as 16-hydroxymethyl-D-nor-5-androstene-$3\beta$-ol and 16-hydroxymethyl-D-nor-19-nor-5-androstene-$3\beta$-ol 3-acetate and the corresponding 16-formyl derivatives. Other novel intermediates of this invention are 16-hydroxymethyl-D-nor-5(10)-dehydro steroids of Formula IV and the 2-dehydro analogs thereof, such as 3-methoxy-16-hydroxymethyl-D-nor-19-nor-2,5(10) - androstadiene, 16-hydroxymethyl-D-nor-19-nor-5(10)-androstene-$3\beta$-ol, and 3 - methoxy - 16 - formyl-D-nor-19-nor - 2,5(10) - androstadiene.

The novel 16-hydroxymethyl- and 16-formyl-D-nor-steriods of Formulae Ia, Ib and II are, in general, anabolic agents possessing a high ratio of anabolic activity to androorganic activity. This high ratio of anabolic to androgenic activity renders the 16-hydroxymethyl-D-nor-androstenes and 16-formyl-D-nor-androstenes of Formulae I and II, as exemplified by 16-hydroxymethyl-D-nor-4-androstene-3-one and 16-formyl-D-nor-4-androstene-3-one, and their 1-dehydro- analogs, valuable in the treatment of severe infections, debilitory states, as well as post-surgical therapy. Our 3-keto-16-hydroxymethyl-D- nor-4-(and -5-) androstenes and 3-keto-16-formyl-D-nor-4- (and -5-) androstenes and their 1-dehydro- and 19-nor analogs, and our 3-keto-16-hydroxymethyl-(and 16-formyl-) D-nor-19-nor5(10)-androstenes are preferably administered orally in known oral dosage forms, wherein the novel D-nor-steroid is compounded with an excipient which is non-toxic, edible or potable, and chemically inert to said D-nor-steroid. A convenient unit dosage is 5 mgm. and 10 mgm., the daily dosage used will depend on the nature and severity of the ailment being treated, the usual daily dosage falls in the range of from 5 mgm. to 50 mgm., although greater amounts may be indicated in severe states.

Our novel 16-hydroxymethyl- and 16-formyl-D-nor-steroids of Formulae I$a$, I$b$, and II are conveniently administered in tablet form in which the D-nor-steroid is compounded with a solid excipient such as lactose, sucrose, starch, pre-gelatinized starch, gum arabic, gum tragacanth and the like. The solid excipient may also contain admixed magnesium stearate, talc, corn starch or two or more of these additives.

The tablets are formed utilizing methods well known in the art.

The 16-hydroxymethyl- and 16-formyl-D-nor-5-androstenes of Formula III and esters thereof and the 16-hydroxymethyl- and 16-formyl-D-nor-19-nor-5(10)-androstenes of Formula IV and the 2-dehydro analogs thereof are valuable as intermediates in preparing the therapeutically active 16-hydroxymethyl- and 16-formyl-D-nor-androstenes of Formulae I$a$, I$b$ and II. Their use as intermediates is more fully described hereinbelow and in the examples. The preferred embodiment of our invention are the compounds of Formulae I$a$ and I$b$, particularly those having a 3-keto-$\Delta^4$-structure.

The therapeutically active 16-hydroxymethyl-D-nor-4-androstenes of Formula I$a$, together with the 19-nor- and 1-dehydro analogs thereof, are conveniently prepared by a process of this invention whereby a 16-carboxy-D-nor-androstene is reduced to a 16-hydroxymethyl-D-nor-androstene followed by conversion of the A and B-ring to the desired $\Delta^4$-3-keto structure.

The 16-formyl-D-nor-derivatives are then derived from the thus prepared 16-hydroxymethyl-D-nor-4-androstenes by oxidation such as via an Oppenauer oxidation.

Classes of 16-carboxy-D-nor-androstenes suitable as starting compounds for our process are 16-carboxy-D-nor-5-androstene-3$\beta$-ols and the 10-nor analogs thereof, 16-carboxy-D-nor-4-androstene-3-ones and the 3-ketal-$\Delta^5$-derivatives thereof, as well as the 16-carboalkoxy esters of the foregoing. Suitable reducing agents are lithium aluminum hydride and, when the starting compound is a 3-hydroxy- or 3-ketal-16-carboalkoxy-D-nor-5-androstene, sodium in alcohol.

After reduction of the aforementioned classes of starting compounds with lithium aluminum hydride according to our process, the resulting 3-hydroxy- or 3-ketal-16-hydroxymethyl intermediates are converted to the desired 3-keto-$\Delta^4$-structure of the compounds of Formula I$a$. When the starting compounds used are D-nor-5-androstene-3-ols or their 19-nor-analogs, conversion of the corresponding 16-hydroxymethyl-$\Delta^5$-3$\beta$-ol intermediate to the 3-keto-$\Delta^4$-structure is effected microbiologically such as with the micro-organism *Flavobacterium dehydrogenans* or chemically via an Oppenauer oxidation such as that using aluminum t-butoxide with acetone in benzene or aluminum isopropoxide with cyclohexanone in toluene. When a 3-keto-16-carboxy-D-nor-4-androstene or a 3-keto-16-carboalkoxy-D-nor-4-androstene is reduced according to our process, the resultant intermediate is a 3-hydroxy-D-nor-4-androstene which may be re-oxidized to the 3-keto-D-nor-$\Delta^4$-structure of Formula I$a$ by treatment with manganese dioxide or with one equivalent of a dichlorodicyanobenzoquinone. After reduction of a 16-carboxy-D-nor-steroid having a 3-ketal-$\Delta^5$-structure, conversion of the resulting 16-hydroxymethyl-D-nor-3-ketal-$\Delta^5$-intermediary steroid is conveniently effected via mild acid hydrolysis such as with aqueous acetic acid to the corresponding 16-hydroxymethyl-D-nor-3-keto-4-androstene of Formula I$a$.

Our 16-formyl-D-nor-$\Delta^4$-steroids of Formula I$a$ are then derived according to our process from the corresponding 16-hydroxymethyl-D-nor-4-androstenes or 16-hydroxymethyl-D-nor-19-nor-4-androstenes of Formula I$a$ via an Oppenauer oxidation with aluminum tertiary-butoxide in acetone and benzene or with aluminum isopropoxide and cyclohexanone; or alternatively, by esterification of the 16-hydroxymethyl group to the p-toluene sulfonate with p-toluene sulfonyl chloride in pyridine, followed by treatment of the sulfonate ester with hot dimethyl sulfoxide in the presence of sodium bicarbonate.

By our process, for example, 16-carboxy-D-nor-$\Delta^5$-3-ols such as 16-carboxy-D-nor-5-androstene-3$\beta$-ol 3-acetate, 16-carboxy-D-nor-19-nor-5-androstene-3$\beta$-ol 3-acetate or their corresponding 16-methyl esters, i.e. 16-carbomethoxy-D-nor-5-androstene-3$\beta$-ol 3-acetate or 16-carbomethoxy-19-nor-5-androstene-3$\beta$-ol 3-acetate are reduced with lithium aluminum hydride to give, respectively, 16-hydroxymethyl-D-nor-5-androstene-3$\beta$-ol and 16-hydroxymethyl-19-nor-D-nor-5-androstene-3$\beta$-ol, each of which, in turn, is subjected to the action of a culture of *Flavobacterium dehydrogenans* to give, respectively, 16-hydroxymethyl-D-nor-4-androstene-3-one and 16-hydroxymethyl-19-nor-D-nor-4-androstene-3-one, $\Delta^4$-compounds of Formula I$a$ wherein Z is —CH$_2$OH. When subjected to an Oppenauer oxidation such as with aluminum isopropoxide and cyclohexanone, the aforenamed 16-hydroxymethyl-D-nor steroids are each converted respectively to 16-formyl-D-nor-4-androstene-3-one and 16-formyl-D-nor-19-nor-4-androstene-3-one, compounds of Formula I$a$ wherein Z is —CHO.

Similarly by our process, 16-carboxy-D-nor-4-androstene-3,11-dione or the 3-ethylene ketal thereof (i.e., 3 - ethylenedioxy-16-carboxy-D-nor-5-androstene-11-one) is reduced with lithium aluminum hydride yielding 16-hydroxymethyl-D-nor-4-androstene-3,11$\beta$-diol or 3-ethylenedioxy - 16 - hydroxymethyl-D-nor-5-androstene-11$\beta$-ol. Oxidation of the former with manganese dioxide and hydrolysis of the latter compound with aqueous acetic acid, for example yields the same compound, namely, 16-hydroxymethyl-D-nor-4-androstene-11$\beta$-ol-3-one of Formula I$a$. Treatment with aluminum isopropoxide and cyclohexanone yields the 16-formyl-11-keto-D-nor-steroid, 6-formyl-D-nor-4-androstene-3,11-dione.

Alternatively, the 16-formyl-D-nor-4-androstenes of Formula I$a$ are derived from the corresponding 16-carboxy acid chlorides via the Rosenmund reduction. Thus, 16-carboxy-D-nor-4-androstene-3-one is converted to the corresponding 16-acid chloride by reaction with oxalyl chloride in benzene in the presence of pyridine. Hydrogenation of the resulting 16-carbonyl chloride-D-nor-4-androstene-3-one using palladium on barium sulfate catalyst in the presence of sulfur-treated quinoline in boiling xylene, will yield 16-formyl-D-nor-4-androstene-3-one.

Still alternatively, the 16-formyl-D-nor-steroids of Formulae I$a$ and I$b$ are derived from 20,21-dioxygenated-D-nor-pregnanes by reaction with periodic acid. For example, D-nor-4-pregnene-21-ol-3,20-dione (prepared as described in the copending application, Serial No. 165,952, filed January 12, 1962, of Jerrold Meinwald) is reduced with lithium aluminum hydride in tetrahydrofuran to give D-nor-4-pregnene-3,20,21-triol. The allylic 3-alcohol of the triol is re-oxidized with manganese dioxide in chloroform to yield D-nor-4-pregnene-20,21-diol-3-one, which, in turn, is subjected to the action of periodic acid in methanol to give the 16-dimethyl acetal of 16-formyl-D-nor-4-androstene-3-one convertible via acid hydrolysis to 16-formyl-D-nor-4-androstene-3-one of Formula I$a$. Alternatively, in the above sequence the order of the steps of periodic acid cleavage and manganese dioxide oxidation may be reversed. Thus D-nor-4-pregnene-3,20, 21-triol is subjected to the action of periodic acid in methanol to give the 16-dimethyl acetal of 16-formyl D-nor-4-androstene-3-ol which is oxidized with manganese dioxide to the 16-dimethyl acetal of 16-formyl-D-nor-4-androstene-3-one. In the above manganese dioxide oxidation both the 3α- and 3β-isomer of the allylic alcohol may be used with success, and in practice the mixture of 3-isomeric alcohols as obtained in the lithium aluminum hydride reductive step may be used directly without separation of isomers. Still alternatively, D-nor-5-pregnene-3β,20,21-triol (prepared as described in Examples 28 and 29) upon reaction with periodic acid yields the 16-dimethyl acetal of 16-formyl-D-nor-5-pregnene-3β-ol. Oxidation with chromic acid to the corresponding 3-keto-Δ⁵-derivative followed by acid hydrolysis of the acetal group yields 16-formyl-D-nor-4-androstene-3-one.

In carrying out the above described periodic acid degradations of a D-nor-pregnane-20,21-diol, by substituting for methanol other lower alkanols such as ethanol, propanol and the like, there will be obtained the corresponding dialkyl acetals, i.e. diethyl acetal, dipropyl acetal, and the like.

An alternate route whereby is prepared a 16-hydroxymethyl-D-nor-19-nor-4-androstene of Formula Ia is by Birch reduction of a 3-alkoxy-16-hydroxymethyl-D-nor-1,3,5(10)-estratriene to the corresponding 3-alkoxy-16-hydroxymethyl-D-nor-2,5(10)-estradiene (a compound of Formula IV) which on treatment with a dilute mineral acid, such as hydrochloric acid, yields directly a 16-hydroxy-methyl-D-nor-19-nor-4-androstene-3-one of Formula I. Alternatively, when hydrolysis of the 3-alkoxy-16-hydroxymethyl-D-nor-2,5(10)-estradiene of Formula IV is carried out with oxalic acid, there is obtained a 16-hydroxymethyl-D-nor-5(10)-estrene-3-one of Formula II which is convertible by means of a mineral acid to a 16 - hydroxy-methyl-D-nor-19-nor-4-androstene-3-one of Formula Ia. The 3-keto-D-nor-5(10)-dehydro-steroids of Formula II, in addition to being therapeutically useful per se, are also valuable as intermediates in the preparation of the 19-nor steroids of Formula I. Thus, by this alternate process, reduction of 16-hydroxymethyl-D-nor-1,3,5(10)-estratriene-3-ol 3-methyl ether with lithium in liquid ammonia (Birch reduction medium) gives 3-methoxy-16-hydroxymethyl-D-nor-2,5(10)-estradiene (i.e. 3 - methoxy - 16 - hydroxymethyl-D-nor-19-nor-2,5(10)-androstadiene) of Formula IV, which, upon treatment with dilute mineral acid, e.g. hydrochloric acid, yields 16-hydroxymethyl - D - nor - 19-nor-4-androstene-3-one (16-hydroxymethyl - D-nor-4-estrene-3-one). Alternatively, hydrolysis of the enol ether, i.e. 3-methoxy-16-hydroxymethyl-D-nor-2,5(10)-estradiene-3-one with oxalic acid yields 16-hydroxymethyl-D-nor-5(10)-estrene-3-one of Formula II which is converted by means of hydrochloric acid to 16-hydroxymethyl-D-nor-19-nor-4-androstene-3-one.

The 16-hydroxymethyl-1,3,5(10)-estartriene starting compounds of our alternate process for preparing the D-nor-19-nor-steroids of Formulae Ia and Ib are conveniently prepared from the corresponding 16-carboxy-D-nor-1,3,5(10)-estratriene by reduction with lithium aluminum hydride. Thus, for example, 3-methoxy-16-carboxy-D-nor-1,3,5(10)-estratriene upon reduction with lithium aluminum hydride yields the starting intermediate 3 - methoxy - 16 - hydroxymethyl - D - nor - 1,3,5(10)-estratriene.

Introduction of the Δ¹-double bond into the novel 16-hydroxymethyl- and 16-formyl-D-nor-4-androstenes of Formula I may be effected by known chemical methods such as by the use of selenium dioxide or by the use of dichloro-dicyano-benzoquinone or alternatively, by microbiological methods utilizing microorganisms such as *Bacillus sphaericus* and *Corynebacterium simplex* (A.T.C.C. 6946). For example, 16-hydroxymethyl-D-nor-4-androstene-3-one and 16-formyl-D-nor-4-androstene-3-one (prepared as described above) are each subjected the action of *Corynebacterium simplex* according to procedures described in U.S. Patent No. 2,837,464 for conversion to the corresponding 1-dehydro analog, 16 - hydroxymethyl - D - nor - 1,4 - androstadiene - 3 - one and 16-formyl-D-nor-1,4-androstadiene-3-one, respectively.

Our D-nor-5-androstenes of Formula Ib and the 1-dehydro- and 19-nor analogs thereof are conveniently derived from the corresponding D-nor-4-androstenes by reaction with sodium hydride in solvent which does not give up a proton such as tetrahydrofuran utilizing techniques such as described by Tanabe and Shapiro in application Serial No. 251,744, filed January 16, 1963. Thus, for example, when a D-nor-Δ⁴-steroid of Formula Ia such as 16-hydroxymethyl-D-nor-4-androstene-3-one, 16-formyl-D-nor-4-androstene-3-one, and the 1-dehydro-and 19-nor analogs thereof is added to a molar excess of sodium hydride in tetrahydrofuran and the mixture is stirred under reflux, there is obtained the corresponding D-nor-Δ⁵-steroid of Formula Ib, i.e., 16-hydroxymethyl - D - nor - 5 - androstene - 3 - one, 16β - formyl-D-nor-5-androstene-3-one and the 1-dehydro- and 19-nor-analogs thereof, respectively.

Alternatively, a 16-hydroxymethyl-D-nor-Δ⁵-3β-ol intermediate of Formula III may be converted directly to a 16-formyl-D-nor-Δ⁵-3-one of Formula Ib by oxidation with Jones reagent, i.e., chromic acid/sulfuric acid in acetone according to known procedures. For example, 16-hydroxymethyl-D-nor-5-androstene-3β-ol or the 19-nor- analog thereof (prepared from 16-carboxy-D-nor-5-androstene-3-ol or the 19-nor-analog thereof via reduction with lithium aluminum anhydride according to our process) upon oxidation with chromic acid/sulfuric acid in acetone will yield 16-formyl-D-nor-5-androstene-3-one and 16-formyl-D-nor-19-nor-5-androstene-3-one respectively.

The esters of our D-nor steroids are prepared according to conventional techniques. Thus, lower alkanoyl esters are prepared by reaction of the corresponding hydroxy compound with pyridine and an acid anhydride. For example, 16-hydroxymethyl-D-nor-4-androstene-3-one upon reaction with acetic acid in pyridine yields the corresponding acetate ester, i.e., 16-acetoxymethyl-D-nor-4-androstene-3-one. By substituting other lower alkanoic acid anhydrides such as propionic anhydride or caproic anhydride, there is obtained the corresponding propionate or caproate ester.

In order to esterify an 11β-hydroxy group in a compound such as 9α-fluoro-16-hydroxymethyl-D-nor-4-androstene-11β-ol-3-one, one may use the esterifying acid in the presence of trifluoroacetic anhydride, or alternatively, the anhydride of the esterifying acid in the presence of strong acid catalyst such as p-toluenesulfonic acid. For example, 9α-fluoro-16-hydroxymethyl-D-nor-4-androstene-11β-ol-3-one upon treatment with acetic acid in the presence of trifluoroacetic anhydride yields 9α-fluoro - 16 - acetoxymethyl - D - nor - 4 - androstene-11β-ol-3-one 11-acetate.

Other 16 esters of our 16-hydroxymethyl-D-nor-androstenes are prepared by known methods. Thus, 16-hydroxymethyl-D-nor-androstenes such as 16-hydroxymethyl - D - nor - 4 - androstene - 3 - one, 16 - hydroxymethyl - D - nor - 1,4 - androstadiene - 3 - one, 16 - hydroxymethyl - D - nor - 19 - nor - 4 - androstene - 3 - one, 16 - hydroxymethyl - D - nor - 5 - androstene - 3 - one, 16 - hydroxymethyl - D - nor - 1,5 - androstadiene - 3-one or 16-hydroxymethyl-D-nor-19-nor-5-androstene-3-one and 16-hydroxymethyl-D-nor-19-nor-5(10)-androstene-3-one, upon reaction in pyridine with a dicarboxylic acid anhydride such as succinic or phthalic anhydride; or acid halides of aryl carboxylic acids such as benzoyl chloride will yield the corresponding 16-acyloxymethyl derivative of Formulae Ia, Ib and II, i.e. the 16-hemisuccinoyloxymethyl-, 16-phthaloyloxymethyl-, or 16- benzoyloxymethyl-, respectively, of D-nor-4-androstene-3-one, D-nor-1,4-androstadiene-3-one, 19-nor-D-nor-4-androstene-3-one, D-nor-5-androstene-3-one, D-nor-1,5-androstadiene - 3 - one, D - nor - 19 - nor - 5 - androstene 3-one, and D-nor-19-nor-5(10)-androstene-3-one.

The 16-acyloxymethyl esters of the D-nor-steroids of Formulae Ia, Ib and II are useful in that the therapeutic activities thereof are generally of longer duration than the corresponding 16-hydroxymethyl-D-nor-steroid. In addition, the salts of the dicarboxylic esters have the additional advantage of being water soluble.

In our process whereby a 16-carboxy-D-nor-5-androstene-3β-ol of a 16-carboxy-19-nor-D-nor-5-androstene-3β-ol is reduced to the corresponding 16-hydroxymethyl-D-nor-5-androstene or 16-hydroxymethyl-D-nor-19-nor-5-androstene, the necessary starting compounds are 16-carboxy-D-nor-$\Delta^{(4\ or\ 5)}$-androstenes and 16-carboxy-D-nor-19-nor-$\Delta^{(4\ or\ 5)}$-androstenes of the following Formulae V and VI including the 3-ketal derivatives of the compounds of Formula VI:

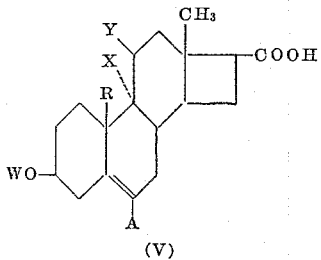

(V)

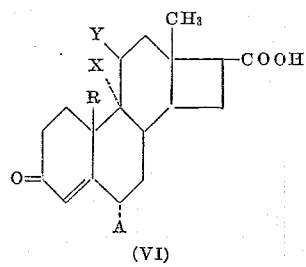

(VI)

wherein A, R, W, X, and Y are as defined for Formulae Ia, Ib, II, III, and IV. The 16-carboxy-D-nor-$\Delta^{(4\ or\ 5)}$-androstene starting compounds are prepared by known procedures such as those described in the copending applications of Jerrold Meinwald, Serial Nos. 163,951 and 165,952 filed on January 12, 1962. One method whereby a 17-keto steroid (I′) is transformed into a 16-carboxy-D-nor-steroid (IV′) is shown by the following reaction scheme wherein R represents the A, B, and C rings of the steroid:

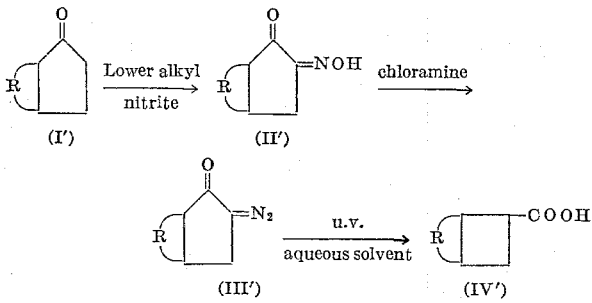

A 17-keto steroid is α-oximated by reacting a 17-keto-steroid with a lower alkyl nitrite, preferably isoamyl nitrite, in the presence of a base, such as an alkoxide. Processing according to conventional techniques yields the oximino ketone II′, which is convertible by conventional methods, such as with chloramine in ether solution to the diazo-ketone, III¹ which is purified by recrystallization from alcohol. Transformation of the α-diazo ketone (III¹) to the 16β-carboxy-D-nor-steroid (IV¹) is effected by irradiating the diazo ketone in an appropriate solvent substantially transparent to ultraviolet light with any one of the conventional ultraviolet emitters. It is believed the diazo ketone, upon irradiation, is first converted to a cyclobutanoid ketene; thus, in order to produce the carboxylic acid (IV¹), the photolysis solution is mixed with water which reacts with the ketene. If alcohols or ammonia derivatives, such as amines, are present in place of water, the corresponding carboxylic acid ester or amide is produced.

Where a carboxylic acid starting compound for the process of this application is being produced, the product is isolated by extraction techniques utilizing alkaline media to separate the acid component. The general method for preparing the 16β-carboxy-D-nor-5-androstene starting compounds of our process is described in greater detail in Preparations 1-4 prior to the examples of this application.

Similarly, the 16β-carboxy-D-nor-1,3,5(10)-estratriene starting compounds for the alternate processes described herein for preparing 16-hydroxymethyl- and 16-formyl-D-nor-19-nor-4-androstenes of this invention are prepared by the above described process.

Thus, for example, 5-androstene-3β-ol-17-one and estrone methyl ether (3-methoxy-1,3,5(10)-estratriene-17-one) upon reaction with potassium t-butoxide and then isoamyl nitrite are converted to the corresponding 16-oximino derivative, e.g. 16-oximino-5-androstene-3β-ol-17-one and 3-methoxy-16-oximino-1,3,5(10)estratriene-17-one, which in turn, upon reaction with chloramine in ether, yield the corresponding 16-diazo derivatives, 16-diazo-5-androstene-3β-ol-17-one and 3 - methoxy-16-diazo-1,3,5 (10)-estratriene-17-one, respectively. Irradiation of the aforementioned 16-diazo derivatives in aqueous dioxane solution under nitrogen atmosphere by means of Sylvania "Black Light" fluorescent tubes yields the necessary 16-carboxy starting compounds of our process, e.g. 16-carboxy-D-nor-5-androstene-3β-ol and 3-methoxy-16-carboxy-D-nor-1,3,5(10)-estratriene, respectively.

The 6, and/or 9 and/or 11-substituted 16-hydroxymethyl- and 16-formyl-D-nor-4-androstenes and D-nor-5-androstenes of Formulae Ia and Ib together with the 1-dehydro- and 19-nor analogs and the 6, and/or 9 and/or 11-substituted - 16 - hydroxymethyl-D-nor-19-nor-5(10)-androstenes of Formula II may be prepared by the process of this application from a 16β-carboxy-D-nor-steroid having the appropriate substituent present at the 6, and/or 9 and/or 11-carbon atoms prior to reduction with lithium aluminum hydride and oxidation by means of *Flavobacterium dehydrogenans*, for example. Alternatively, and preferably, the C-6, and/or 9 and/or 11-substituted analogs of our novel 16-hydroxymethyl and 16-formyl-D-nor-steroids are introduced into the corresponding unsubstituted 16-hydroxymethyl-D-nor-steroid. Thus, for example, to introduce the 6α-fluoro and 6α-methyl moieties, 16-hydroxymethyl-D-nor-4-androstene-3-one of this invention is converted to the corresponding 16-acyloxymethyl derivative with acetic anhydride and pyridine followed by treatment with ethylene glycol and p-toluene sulfonic acid in benzene to give the 3-ethylene ketal-$\Delta^5$-analog, e.g., 16-acetoxymethyl-3-ethylenedioxy-D-nor-5-androstene, which is epoxidized with an organic peracid such as perhthalic acid. Upon separation of the resulting mixture of epoxides there is obtained 16-acetoxymethyl-5α,6α-oxido-D-nor-androstane-3-one 3-ethylene ketal, convertible to either a 6-methyl or 6-fluoro derivative depending on the choice of reactant. Thus, reaction of 5α,6α-oxido-16-acetoxymethyl-D-nor-androstane-3-one 3-ethylene ketal with methyl magnesium iodide gives the corresponding 6β-methyl-5α-hydroxy analog which is hydrolyzed with aqueous acetic acid to 16-hydroxymethyl-6β-methyl-D-nor-androstane-5α-ol-3-one. Acetylation to the corresponding 16-acetoxymethyl compound followed by treatment with hydrochloric acid yields 16 - acetoxymethyl-6α-methyl-D-nor-4-androstene-3-one of Formula I which is hydrolyzed to the corresponding 16-hydroxymethyl-D-nor-steroid with dilute acid or base. To introduce the 6α-fluoro moiety, the aforementioned 5α,6α-oxido-3-ethylene ketal, e.g., 5α,6α-oxido-16-acetoxymethyl-D-nor-androstane-3-one 3 - ethylene ketal is treated with boron trifluoride to give the corresponding 5α-hydroxy-6β-fluoro derivative, e.g., 5α-hydroxy-6β-fluoro-16-acetoxymethyl-D-nor-androstane-3-one 3-ethylene ketal which is hydrolyzed by treatment with aqueous acetic acid to the corresponding 3-ketone, e.g., 16-acetoxymethyl - 6β - fluoro-D-nor-androstane-5α-ol-3-one which is simultaneously dehydrated and epimerized by treatment with hydrochloric acid yielding 16-acetoxymethyl-6α-fluoro-D-nor-4-androstene-3-one, which is hydrolyzed to the corresponding 16-hydroxymethyl-D-nor steroid by acidic or basic hydrolysis.

Introduction of a 9(11)-double bond and the subsequent introduction of 9,11-halohydrins and 9α,11β-dihalogeno derivatives into our novel D-nor steroids is also effected by methods analogous to those used in the cyclopentanoid-D-ring steroidal art. Thus, by subjecting 16-hydroxymethyl-D-nor-4-androstene-3-one and 16-formyl-D-nor-4-androstene, to the action of *Glomerella cingulata* followed by treating the resulting 11α-hydroxy derivavtive to the action of the organism *Corynebacterium simplex* there is obtained 16-hydroxymethyl- and 16-formyl-D-nor-1,4-androstadiene-11α-ol-3-one. Esterification of the 11-hydroxyl with methane sulfonyl chloride in pyridine yields the 11-methanesulfonate esters 16-methanesulfonyloxymethyl- and 16-formyl-D-nor-1,4-androstadiene-11α-ol 11-methane sulfonate. Reaction with sodium acetate in acetic acid converts these esters to the respective 9(11)-dehydrosteroid, i.e., 16-acetoxymethyl- and 16-formyl-D-nor-1,4,9(11)-androstatriene-3-one.

Alternatively, prior to esterification with methane sulfonyl chloride the 16-hydroxymethyl group may be selectively esterified with acetic anhydride in pyridine, for example. Reaction of the 16-acetoxymethyl-D-nor-1,4-androstadiene-11α-ol-3-one thereby formed with methane sulfonyl chloride yields the corresponding 11α-methanesulfonate ester convertible upon reaction with sodium acetate in acetic acid to the corresponding 9(11)-dehydro steroid, 16-acetoxymethyl-D-nor-1,4,9(11)-androstatriene-3-one.

Alternatively, 9(11)-dehydro-D-nor-steroids such as the aforementioned may be conveniently prepared from an 11β-hydroxy steroid by the action of methanesulfonyl chloride in dimethylformamide. Thus, 16-acetoxymethyl-D-nor-4-androstene-11β-ol-3-one may be converted in one step to 16-acetoxymethyl-D-nor-4,9(11)-androstadiene-3-one by reaction with methanesulfonyl chloride. Hydrolysis of the 16-acetoxymethyl group to the corresponding 16-hydroxymethyl is then conveniently effected via acid hydrolysis utilizing known techniques.

The 16 - hydroxymethyl - D - nor-9(11)-dehydroandrostanes (preferably protected at C–16 by an ester group) and the 16-formyl-D-nor-9(11)-dehydroandrostanes of Formulae Ia and Ib are valuable as intermediates in preparing the corresponding 9,11-halohydrins and 9,11-dihalogeno derivatives. For example, treatment of 16-acetoxymethyl - D - nor - 1,4,9(11) - androstatriene - 3-one with N-bromoacetamide and perchloric acid in aqueous dioxane results in the corresponding bromohydrin, i.e., 9α-bromo-16-acetoxymethyl-D-nor-1,4-androstadiene-11β-ol-3-one. Treatment of the latter compound with potassium acetate in acetone results in the corresponding 9β,11β-oxido derivative of Formula Ia, i.e., 9β,11β-oxido-16-acetoxymethyl-D-nor-1,4-androstadiene-3-one. By the action of hydrofluoric acid or hydrochloric acid on this oxido intermediate there may be prepared the corresponding chlorohydrin and fluorohydrin derivatives. Thus, when hydrogen fluoride is added to 9β,11β-oxido-16-acetoxymethyl-D-nor-1,4-androstadiene-3-one there is obtained 9α - fluoro - 16 - acetoxymethyl - D - nor-1,4-androstadiene-11β-ol-3-one; whereas the action of hydrogen chloride on the aforenamed 9,11-oxido-D-nor-steroid will produce 9α - chloro - 16 - acetoxymethyl-D-nor-1,4-androstadiene-11β-ol-3-one.

The 9(11)-dehydro-D-nor-steroids are also valuable as intermediates in preparing the corresponding 9α,11β-dihalogeno-D-nor-steroids by utilizing techniques on our 16-hydroxymethyl- (preferably protected by an ester group, e.g. 16-acetoxymethyl-) and 16-formyl-D-nor-9(11)-dehydro steroids similar to those described in U.S. Patents Nos. 2,894,963 and 3,009,928–3,009,933. For example, 16 - acetoxymethyl - D - nor - 1,4,9(11) - androstatriene-3-one upon reaction with chlorine in chloroform yields 9α,11β-dichloro-16-acetoxymethyl-D-nor-1,4-androstadiene-3-one whereas reaction with N-bromoacetamide and hydrogen chloride in acetic acid will give 9α-bromo-11β - chloro - 16 - acetoxymethyl - D - nor - 1,4 - androstadiene-3-one.

It is to be understood that in the specification and in the examples, the conversions shown are by way of illustration only, it being obvious to one skilled in the art that analogous transformations can be carried out when other intermediates are used.

The following are examples which illustrate our invention. The invention is not to be limited to the exact details of operation or exact compounds shown and described as obvious modifications will be apparent to one skilled in the art; the invention is therefore to be limited only by the scope of the appended claims.

PREPARATION 1

*General method for preparation of α-oximino-ketones*

Dissolve 1 mole of potassium in about 1 l. of anhydrous t-butanol. Stir and add a solution of 1 mole of the trans-fused cyclopentanone. Continue stirring and dropwise add 1 mole of isoamyl nitrite. Stir reaction for several hours and then pour into water. Extract the mixture with methylene chloride and discard the extracts. Acidify the aqueous phase and extract with ether. Combine and dry the ether extracts and evaporate to a residue consisting of the α-oximino-ketone.

PREPARATION 2

*General method for preparation of α-diazo-ketones from α-oximino-ketones*

Dissolve 1 mole of the α-oximino-ketone (from Preparation 1) in excess aqueous potassium hydroxide. Cool to 5° C. and add an excess of chloramine in ether. Stir for several hours and separate the yellow ether layer. Repeat treatment of the aqueous phase with ethereal chloramine. Combine the ethereal portions, wash with water, dry over anhydrous magnesium sulfate. Evaporate to a residue yielding crude α-diazo-ketone.

PREPARATION 3

*General method for preparation of trans-fused cyclobutane carboxylic acid from α-diazo-ketone*

With a low energy source of ultraviolet light irradiate a dioxane-water (4:1) solution of the α-diazo-ketone (5% concentration). When evolution of nitrogen has ceased, concentrate the solution to about one third volume. Dilute the concentrate with water, add excess alkali and extract with methylene chloride. Discard the extracts. Acidify the aqueous phase and extract with ether. Dry the ether solution and evaporate to a residue consisting of crude product.

In order to prepare a 16-carboxy ester, the dioxane-water solvent is replaced by dioxane-alkanol, the alkanol being the desired alcohol component of the ester such as methyl, ethyl or other aliphatic alcohols. The ester is obtained by dilution and extraction.

Similarly, by employing a solution of an amine such as ammonia, lower di-alkylamines, piperidine, pyrolidine, morpholine, and the like, in admixture with dioxane or tetrahydrofuran, the corresponding 16-carboxamide is produced.

Alternatively, the ester of a trans-fused cyclobutane carboxylic acid is prepared by treating the 16-carboxylic acid via conventional techniques, such as with diazomethane whereby the 16-carbomethoxylate is obtained.

EXAMPLE 1

*D-nor-5-androstene-3β-ol-16β-carboxylic acid 3-acetate*

A. 16-OXIMINO-5-ANDROSTENE-3β-OL-17-ONE

Dissolve 28.4 g. of potassium in 1 l. of dry t-butanol. Add 28 g. of 5-androstene-3β-ol-17-one and stir vigorously for one hour. Add 20 ml. of isoamyl nitrite and continue stirring for eight hours. Add 20 ml. additional of isoamyl nitrite and stir overnight. Add an equal volume of water and acidify with 3 N hydrochloric acid. Extract thoroughly with ether. Wash the ether solution with aqueous potassium carbonate; then exhaustively extract the ether solution with 0.5 N potassium hydroxide. Warm the alkaline solution to remove ether; then cool and filter. Acidify the filtrate with 3 N hydrochloric acid. Collect the precipitate, 16-oximino-5-androstene-3β-ol-17-one on a filter and dry.

B. 16-DIAZO-5-ANDROSTENE-3β-OL-17-ONE

Dissolve 2.5 g. of sodium hydroxide in 400 ml. of water contained in a 3 l. flask. Cool in ice and while stirring add 9.5 g. of 16-oximino-5-androstene-3β-ol-17-one. Then add 50 ml. of distilled chloramine-ether solution (prepared as per Inorganic Synthesis, vol. 1, p. 59, McGraw-Hill, New York, 1939) and 800 ml. of ether. Stir for twelve hours; then decant the yellow ether layer. Repeat the chloramine and ether treatment permitting the reaction mixture to attain room temperature. Decant the ether layer; then combine the ether solutions. Wash the combined ether solution several times with 800 ml. portions of water. Dry the ether solution and evaporate to a residue substantially of 16-diazo-5-androstene-3β-ol-17-one. Purify by recrystallization from methanol.

C. 16-DIAZO-5-ANDROSTENE-3β-OL-17-ONE 3-ACETATE

To 1 g. of 16-diazo-5-androstene-3β-ol-17-one in 10 ml. of pyridine add 1 ml. of acetic anhydride. Allow the solution to stand overnight at room temperature then pour into 100 ml. of water. Filter the resultant precipitate of 16-diazo-5-androstene-3β-ol-17-one 3-acetate. Purify by crystallization from ethyl acetate.

D. D-NOR-5-ANDROSTENE-3β-OL-16β-CARBOXYLIC ACID 3-ACETATE

Dissolve 5 g. of 16-diazo-5-androstene-3β-ol-17-one 3-acetate in 400 ml. of 80% aqueous dioxane and irradiate the solution by means of Sylvania "Black Light" fluorescent tubes until nitrogen evolution ceases (about 36 to 40 hours). Concentrate on a rotary film evaporator. Dissolve residue in ether and wash the ether solution with water, then concentrate in vacuo to a residue of D-nor-5-androstene-3β-ol-16β-carboxylic acid 3-acetate. Purify by crystallization from aqueuos acetone.

By utilizing methanol a solvent instead of 80% aqueous dioxane in the above procedure there is obtained 16β-carbomethoxy-D-nor-5-androstene-3β-ol 3-acetate. Purify by crystallization from ether-hexane.

EXAMPLE 2

*16β-hydroxymethyl-D-nor-4-androstene-3-one*

A. 16β-HYDROXYMETHYL-D-NOR-5-ANDROSTENE-3β-OL

Add a solution of 700 mg. of D-nor-5-androstene-3β-ol-16β-carboxylic acid 3-acetate (or, alternatively, 16β-carbomethoxy-D-nor-5-androstene-3β-ol 3-acetate) in 30 ml. of freshly distilled tetrahydrofuran to a stirred slurry of 400 mg. of lithium aluminum hydride in 25 ml. of pure tetrahydrofuran in a nitrogen atmosphere. Stir the mixture at reflux temperature for one and one-half hours; then stir at room temperature overnight. Destroy the excess lithium aluminum hydride by the addition of ether acetate followed by a saturated solution of sodium sulfate and some solid sodium sulfate. Separate the water layer from the organic solution. Filter the tetrahydrofuran solution and concentrate to a residue. Dissolve the residue in acetone; filter the acetone solution from the inorganic matter and then concentrate the filtered acetone solution to a small volume. Filter the precipitate of substantially 16β-hydroxymethyl-D-nor-5-androstene-3β-ol which separates; then purify by recrystallization twice from acetone. M.P. 180–184° C., $[\alpha]_D$ —28.6° (dioxane).

B. 16β-HYDROXYMETHYL-D-NOR-4-ANDROSTENE-3-ONE

Subject 16β-hydroxymethyl-D-nor-5-androstene-3β-ol to the action of a culture of *Flavobacterium dehydrogenans* (Rutgers Collection No. 130) as follows:

The culture of the organism is prepared by propagating it in a nutrient agar medium at 30° C. for 24 to 72 hours. During incubation, the inoculated tube is exposed to light with the resultant development of a yellow pigment characteristic of the species. The developed culture is rinsed from an agar slant under steril conditions into a steril medium of pH 6.8 and having the following composition:

Yeast extract (Difco) _____ gm __ 10
Potassium phosphate monobasic _____ gm __ 4.48
Sodium phosphate dibasic _____ gm __ 4.68
Tap water to 1 liter This culture medium has previously been autoclaved, at 15 lb. pressure, for twenty minutes to obtain aseptic conditions, and cooled. The variant is grown in the medium under constant illumination, using the visible range of the spectrum. The incubation temperature is maintained at about 33° C. and is conducted under aerobic conditions. Aeration is accomplished by agitation and/or blowing air through the culture medium.

After the organism has grown for 12 to 24 hours (or longer, if desired), 100 ml. of the growing culture are introduced into each of ten flasks, and to each flask are added 200 mg. of 16β-hydroxymethyl-D-nor-5-androstene-3β-ol dissolved in a minimum volume of methanol. The reaction mixtures are then shaken at 30° C. for 24 hours. (The reaction is stopped when paper chromatography indicates that there is no more starting material.)

The contents of the flasks are combined and extracted with chloroform. The chloroform extracts are combined and concentrated to a residue which is chromatographed on Florisil. The 40–70% ether in hexane eluates are concentrated to a residue of substantially 16β-hydroxymethyl-D-nor-4-androstene-3-one which is then crystallized from ether-hexane. M.P. 138–139.5° C., $$[\alpha]_D + 114°$$

(dioxane).

EXAMPLE 3

*Esters of 16β-hydroxymethyl-D-nor-4-androstene-3-one*

To a solution of 500 mg. of 16β-hydroxymethyl-D-nor-4-androstene-3-one in 5 ml. of dry pyridine, add 0.25 ml. of acetic anhydride. Keep the mixture at room temperature overnight; then pour into ice water with stirring. Filter the resultant precipitate, wash with water, dry, and crystallize from acetonehexane to give 16β-hydroxymethyl-D-nor-4-androstene-3-one acetate.

In a similar manner, by substituting propionic anhydride or benzoyl chloride for acetic anhydride in the above procedure there is obtained, respectively, 16β-hydroxymethyl-D - nor - 4-androstene - 3-one propionate and 16β - hydroxymethyl-D-nor-4-androstene-3-one benzoate.

EXAMPLE 4

*16β-hydroxymethyl-D-nor-1,4-androstadiene-3-one and esters thereof*

A. 16β-HYDROXYMETHYL-D-NOR-1,4-ANDROSTADIENE-3-ONE

*Bacillus sphaericus* var. *fusiformis* (A.T.C.C. 7055) is incubated on a nutrient agar (composed of Bacto-beef extract, 3 g.; Bacto-peptone, 5 g.; sodium chloride, 8 g.; agar, 15 g.; tap water, 1 liter) for 24 hours at 28°.

To 100 ml. of a steril nutrient broth (composed of Bacto-beef extract, 3 g.; Bacto-peptone, 5 g.; per liter of tap water) in a 300 ml. flask is added 1 loopful of the incubated culture and the broth mixture is further incubated for 24 hours at 28° on a shaking machine. The broth culture so obtained is employed as an inoculum (1%).

Into each of ten flasks containing 100 ml. of sterile nutrient broth is added 1 ml. of the inoculum. The flasks are agitated on a rotary shaker for 8 hours at 28° at 240 strokes per minute. After this growth period, a solution of 25 mg. of 16β-hydroxymethyl-D-nor-4-androstene-3-one in 0.5 ml. of methanol is aseptically added to each flask which in turn is reshaken and incubated for an additional 24 hours. The final pH is 7.8.

The contents of the flasks are combined and extracted three times with 2 l. of chloroform per extraction. The combined chloroform extracts are evaporated to a residue which is crystallized from acetone-hexane to give 16β-hydroxymethyl-D-nor-1,4-androstadiene-3-one.

B. PREPARATION OF ESTERS

Allow 16β - hydroxymethyl-D-nor-1,4-androstadiene-3-one to react with acetic anhydride in pyridine in the manner described in Example 3 to obtain 16β-hydroxymethyl-D-nor-1,4-androstadiene-3-one acetate.

In a similar manner, by substituting propionic anhydride or benzoyl chloride for acetic anhydride in the above procedure there is obtained, respectively, 16β-hydroxymethyl-D-nor-1,4-androstadiene-3-one propionate and 16β-hydroxymethyl-D-nor-1,4-androstadiene-3-one benzoate.

EXAMPLE 5

*16β-hydroxymethyl-D-nor-19-nor-4-androstene-3-one*

A. 16β-HYDROXYMETHYL-D-NOR-19-NOR-5-ANDROSTENE-3β-OL

In a manner similar to that described in Example 2A, allow D - nor - 19 - nor-5-androstene-3β-ol-16β-carboxylic acid 3-acetate or, alternatively, 16β-carbomethoxy-D-nor-19-nor-5-androstene-3β-ol-3-acetate (prepared from 19-nor-5-androstene-3β-ol-17-one by procedures similar to those described in Example 1), to react with lithium aluminum hydride in tetrahydrofuran. Isolate the resultant product in the described manner and purify by crystallization from acetone-hexane to give 16β-hydroxymethyl-D-nor-19-nor-5-androstene-3β-ol.

B. 16β-HYDROXYMETHYL-D-NOR-19-NOR-4-ANDROSTENE-3-ONE

Subject 16β-hydroxymethyl-D-nor-19-nor-5-androstene-3β-ol to the action of a culture of *Flavobacterium dehydrogenans* in a manner similar to that described in Example 2B. Isolate and purify the resultant product in the described manner to give 16β-hydroxymethyl-D-nor-19-nor-4-androstene-3-one.

EXAMPLE 6

*Alternative procedure for the preparation of 16β-hydroxymethyl-D-nor-19-nor-4-androstene-3-one*

A. 3-METHOXY-16β-HYDROXYMETHYL-D-NOR-2,5(10)-ESTRADIENE

To a stirred solution of 1 g. of 3-methoxy-16β-hydroxymethyl-D-nor-1,3,5(10)-estratriene in 100 ml. of ether and 100 ml. of liquid ammonia at about −60° C. add 1 g. of lithium metal in small pieces. To the resulting blue solution add 32 ml. of ethanol over a period of fifty minutes. Then allow the decolorized solution to evaporate, add water to the residue, and extract with ether. Wash and dry the combined ether extracts and concentrate to a residue. Purify the residue by crystallization from acetonehexane, yielding 3-methoxy-16β-hydroxymethyl-D-nor-2,5(10)-estradiene.

B. 16β-HYDROXYMETHYL-D-NOR-5(10)-ESTRENE-3-ONE

Keep at room temperature for forty minutes a solution of 200 mg. of 3-methoxy-16β-hydroxymethyl-D-nor-2,5(10)-estradiene in 16 ml. of methanol and 3 ml. of water containing 250 ml. of oxalic acid. Pour the reaction mixture into ice water and filter the resulting precipitate. Purify the precipitate by crystallization from ether-hexane to give 16β-hydroxymethyl-D-nor-5(10)-estrene-3-one.

C. 16β-HYDROXYMETHYL-D-NOR - 19 - NOR - 4 - ANDROSTENE - 3 - ONE (16β-HYDROXYMETHYL - D - NOR-4-ESTRENE-3-ONE)

Heat under reflux for twenty minutes a solution of 200 mg. of 16β-hydroxymethyl-D-nor-5(10)-estrene-3-one in 50 ml. of 90% aqueous methanol containing 0.5 ml. of concentrated hydrochloric acid. Cool the reaction mixture; then concentrate under reduced pressure to a residue. Add cold water to the residue, filter the resultant precipitate, wash with water, dry, and crystallize from acetone-hexane, yielding 16β - hydroxymethyl - D - nor-19-nor-4-androstene-3-one.

Alternatively, the compound of this example may be prepared by treating 3 - methoxy - 16β - hydroxymethyl-2,5(10)-estradiene with hydrochloric acid in methanol in the manner described in the paragraph above.

EXAMPLE 7

*Esters of 16β-hydroxymethyl-D-nor-19-nor-4-androstene 3-one*

In a manner similar to that described in Example 3, treat 16β-hydroxymethyl-D-nor-19-nor-4-androstene-3-one with propionic acid anhydride in pyridine to give 16β-hydroxymethyl-D-nor-19-nor-4-androstene-3-one propionate.

In a similar manner, by substituting acetic anhydride or valeric anhydride or benzoyl chloride for propionic anhydride in the above procedure there is obtained, respectively, 16β - hydroxymethyl-D-nor-19-nor-4-androstene-3-one acetate, 16β-hydroxymethyl-D-nor-19-nor-4-androstene-3-one valerate, and 16β-hydroxymethyl-D-nor-19-nor-4-androstene-3-one benzoate.

To prepare the 16-hemisuccinate ester add one gram of succinic anhydride to one gram of 16β-hydroxymethyl-D-nor-19-nor-4-androstene-3-one in 10 ml. of pyridine. Heat the mixture on a steam bath for one hour, cool and dilute with water. Filter the resultant solid, wash with water, and air dry to give 16β-hydroxymethyl-D-nor-19-nor-4-androstene-3-one hemisuccinate.

EXAMPLE 8

*16β-formyl-D-nor-4-androstene-3-one*

To a dry solution of 1 g. of 16β-hydroxymethyl-D-nor-4-androstene-3-one in 100 ml. of toluene and 3 ml. of cyclohexanone heated to reflux temperature add a solution of 500 mg. of aluminum isopropoxide in 10 ml. of toluene. Then heat the resulting mixture under reflux for one hour. Cool the mixture to room temperature; then neutralize by adding a 10% solution of acetic acid in toluene. Then pass steam through the mixture for one hour. Cool the resultant residue. Extract with chloroform; then wash the combined chloroform extracts with water, dry, and concentrate to a residue containing 16β-formyl-D-nor-4-androstene-3-one. Purify the residue by chromatography on a column of Florisil packed in hexane eluting with hexane and increasing percentages of ether in hexane. Combine fractions on the basis of their infrared spectra, i.e. those with no hydroxyl band, and with a carbonyl band at about 5.82μ and a band at 6.00μ for a conjugated ketone. Concentrate the combined fractions to a residue. Recrystallize the residue from acetone-hexane to give 16β-formyl-D-nor-4-androstene-3-one.

EXAMPLE 9

*16β-formyl-D-nor-1,4-androstadiene-3-one*

In a manner similar to that described in Example 4A, subject 16β-formyl-D-nor-4-androstene-3-one to the action of a culture of *Bacillus sphaericus* and isolate the product in the described manner. Purify the product by crystallization from acetone-hexane to give 16β-formyl-D-nor-1,4-androstadiene-3-one.

EXAMPLE 10

*16β-formyl-D-nor-19-nor-4-androstene-3-one*
*(16β-formyl-D-nor-4-estrene-3-one)*

A. Allow 16β - hydroxymethyl-D-nor-19-nor-4-androstene-3-one (the compound of Example 5) to react with cyclohexanone and aluminum isopropoxide in the manner described in Example 8. Isolate the resultant product in the manner described and purify by crystallization from acetone-hexane to give 16β-formyl-D-nor-19-nor-4-androstene-3-one.

Alternatively, the compound of this example may be prepared according to the following procedures—10B and 10C.

B. 3-METHOXY-16β-FORMYL-D-NOR-2,5(10)-ESTRADIENE

Allow 3 - methoxy-16β-hydroxymethyl-D-nor-2,5(10)-estradiene to react with cyclohexanone in the presence of aluminum isopropoxide according to the procedure of Example 8. Isolate the resultant product in a manner similar to that described in Example 8, except that in the place of acetic acid, 10 ml. of a concentrated solution of potassium sodium tartrate is added before the steam distillation. After chromatography, combine those fractions which shown only an aldehyde carbonyl absorption at 5.82μ in the infrared. Purify by crystallization from ether-pentane to give 3-methoxy-16β-formyl-D-nor-2,5(10)-estradiene.

C. 16β-FORMYL-D-NOR-19-NOR-4-ANDROSTENE-3-ONE

Allow 3-methoxy-16β-formyl-D-nor-2,5(10)-estradiene to react with oxalic acid according to the procedure of Example 6B. Isolate the resultant product in the described manner and purify by crystallization from acetone-hexane to give 16β-formyl-D-nor-5(10)-estrene-3-one.

React 16β - formyl-D-nor-5(10)-estrene-3-one with methanolic hydrogen chloride in the manner of Example 6C. Isolate the resultant product in the described manner and purify by crystallization from ether to give 16β-formyl-D-nor-19-nor-4-androstene-3-one.

EXAMPLE 11

*16β-hydroxymethyl-D-nor-4-androstene-11β-ol-3-one*

A. 16β-HYDROXYMETHYL-D-NOR-4-ANDROSTENE-3,11β-DIOL

The requisite intermediate, 16β-carboxy-D-nor-4-androstene-3,11-dione, is prepared from 4-androstene-3,11,17-trione 3-ethylene ketal in a manner similar to that described in Preparations 1–3 and in Example 1, whereby 4-androstene-3,11,17-trione 3-ethylene ketal is reacted with isoamyl nitrite in the presence of potassium butoxide to give 16-aximino-4-androstene-3,11,17-trione, which, in turn, is reacted with chloramine in ether to give 16-diazo - 4-androstene-3,11,17-trione, which when dissolved in aqueous dioxane and irradiated with ultraviolet light is converted to 16β-carboxy - D - nor-4-androstene-3,11-dione.

Reduce 2 g. of 16β-carboxy-D-nor-4-androstene-3,11-dione with 2 g. of lithium aluminum hydride in tetrahydrofuran according to the procedure of Example 2A. Isolate the resultant product in the described manner to give 16β-hydroxymethyl-D-nor - 4 - androstene-3,11β-diol, which is used without further purification in Procedure 11B.

In a similar manner, 6α-methyl-16β-carboxy-D-nor-4-androstene-3-,11-dione and 6α-fluoro-16β-carboxy-D-nor-4-androstene-3,11-dione (prepared from 6α - methyl-4-androstene-3,11,17-trione and 6α - fluoro-4-androstene-3,11,17-trione, respectively, in a manner similar to that described in the first paragraph of this example) are reduced with lithium aluminum hydride according to the procedure of Example 2A to give, respectively, 6α-methyl-16β-hydroxymethyl-D-nor-4-androstene-3,11β - diol and 6α-fluoro-16β-hydroxymethyl-D-nor-4-androstene - 3,11β-diol.

B. 16β-HYDROXYMETHYL-D-NOR-4-ANDROSTENE-11β-OL-3-ONE

To a solution of 1 g. of 16-hydroxymethyl-D-nor-4-androstene-3,11β-diol in 50 ml. of dry chloroform add 5 g. of active manganese dioxide powder and stir the mixture at room temperature for 24 hours. Filter and concentrate the filtrate to a low volume. Add hexane to the concentrated residue. Isolate the resultant solid by filtration giving 16β-hydroxymethyl-D-nor-4-androstene-11β-ol-3-one.

In a similar manner, 6α - methyl - 16β - hydroxymethyl-D-nor-4-androstene-3,11β-diol and 6α-fluoro-16β-hydroxymethyl-D-nor-4-androstene-3,11β-diol upon treatment with manganese dioxide in the above described manner yield, respectively, 6α-methyl-16β-hydroxymethyl-D-nor-4-androstene-11β-ol-3-one and 6α-fluoro-16β-hydroxymethyl-D-nor-4-androstene-11β-ol-3-one.

EXAMPLE 12

*16β-acetoxymethyl-D-nor-4-androstene-11β-ol-3-one*

Treat 16β-hydroxymethyl-D-nor-4-androstene-11β - ol-3-one with acetic anhydride in pyridine according to the procedure of Example 3A to obtain 16β-acetoxymethyl-D-nor-4-androstene-11β-ol-3-one.

In a similar manner, 6α-methyl-16β-hydroxymethyl-D-nor-4-androstene-11β-ol-3-one and 6α-fluoro-16β-hydroxymethyl-D-nor-4-androstene-11β-ol-3-one are reacted with acetic anhydride in pyridine to give, respectively, 6α - methyl-16β-acetoxymethyl-D-nor-4-androstene-11β-ol-3-one and 6α-fluoro-16β-acetoxymethyl-D-nor-4-androstene-11β-ol-3-one.

EXAMPLE 13

*16β-acetoxymethyl-D-nor-4,9(11)-androstadiene-3-one*

To a solution of 1 g. of 16β-acetoxymethyl-D-nor-4-androstene-11β-ol-3-one in 5 ml. of distilled dimethylformamide and 5 ml. of anhydrous pyridine add 0.5 ml. of methane sulfonyl chloride and heat the mixture at about 80° C. for one hour. Cool the solution, pour into ice water, and filter the resultant precipitate. After drying the precipitate, dissolve it in acetone and treat the acetone solution with decolorizing carbon. Add hexane to the warm, purified acetone solution to the point of turbidity, then cool. Filter the resultant precipitate comprising 16β-acetoxymethyl-D-nor-4,9(11)-androstadiene-3-one.

In a similar manner, 6α-fluoro-16β-acetoxymethyl-D-nor-4-androstene-11β-ol-3-one and 6α-methyl-16β-acetoxymethyl-D-nor-4-androstene-11β-ol-3-one are reacted with dimethylformamide in pyridine in the presence of methane sulfonyl chloride to obtain, respectively, 6α-fluoro-16β-acetoxymethyl-D-nor-4,9(11)-androstadiene-3-one and 6α-methyl - 16β-acetoxymethyl-D-nor-4,9(11)-androstadiene-3-one.

EXAMPLE 14

*9α,11β-dichloro-16β-acetoxymethyl-D-nor-4-androstene-3-one*

To a solution of 500 mg. of 16β-acetoxymethyl-D-nor-4,9(11)-androstadiene-3-one in 15 ml. of methylene chloride containing 1 ml. of pyridine cooled to −20° C., add a solution of 115 mg. of chlorine in 2.8 ml. of carbon tetrachloride. Stir the mixture at −20° C. for thirty minutes; then allow it to come to room temperature. Dilute the reaction mixture with methylene chloride; then wash with water and aqueous sodium thiosulfate solution. Dry the methylene chloride solution over sodium sulfate, filter, and concentrate in vacuo to a residue substantially of 9α,11β-dichloro-16β-acetoxymethyl-D-nor-4-androstene-3-one. Purify by crystallization from acetone-hexane.

In a similar manner, 6α-fluoro-16β-acetoxymethyl-D-nor-4,9(11)-androstadiene-3-one and 6α-methyl-16β-acetoxymethyl-D-nor-4,9(11)-androstadiene-3-one are each reacted with chlorine in carbon tetrachloride in the above-described manner, and the resultant products isolated and purified to give 6α-fluoro-9α,11β-dichloro-16β-acetoxymethyl-D-nor-4-androstene-3-one and 6α-methyl-9α,11β-dichloro-16β-acetoxymethyl-D-nor-4-androstene-3-one, respectively.

EXAMPLE 15

*9α-bromo-11β-fluoro-16β-acetoxymethyl-D-nor-4-androstene-3-one*

To a solution of 500 mg. of 16β-acetoxymethyl-D-nor-4,9(11)-androstadiene-3-one in 25 ml. of diethylacetic acid contained in a polyethylene bottle add 3 ml. of a solution of hydrogen fluoride in chloroform-tetrahydrofuran (about 120 mg. of hydrogen fluoride per ml.) followed by 220 ml. of N-bromoacetamide. Stir the mixture at room temperature for two hours; then pour into cold aqueous potassium carbonate solution. Stir the mixture well; then extract with methylene chloride. Combine the methylene chloride extracts, wash with 5% aqueous sodium hydroxide, then water, dry over sodium sulfate, and filter. Concentrate the dried methylene chloride solution to a small volume and add pentane. Filter the solid which separates giving 9α-bromo-11β-fluoro-16β-acetoxymethyl-D-nor-4-androstene-3-one.

In a similar manner, 6α-fluoro-16β-acetoxymethyl-D-nor-4,9(11)-androstadiene-3-one and 6α-methyl-16β-acetoxymethyl-D-nor-4,9(11)-androstadiene-3-one are each reacted with hydrogen fluoride and N-bromoacetamide in the manner described above and the resultant products isolated to give 6α,11β-difluoro-9α-bromo-16β-acetoxymethyl - D-nor-4-androstene-3-one and 6α-methyl-9α-bromo-11β-fluoro-16β-acetoxymethyl-D-nor-4-androstene-3-one, respectively.

EXAMPLE 16

*6α,11β-difluoro-9α-chloro-16β-acetoxymethyl-D-nor-4-androstene-3-one*

To a solution of 500 mg. of 6α-fluoro-16β-acetoxymethyl-D-nor-4,9(11)-androstadiene-3-one in 20 ml. of methylene chloride and 3 ml. of dry pyridine contained in a polyethylene bottle, add 210 mg. of N-chlorosuccinimide followed by 2 ml. of a solution of hydrogen fluoride in tetrahydrofuran-chloroform (about 120 mg. of hydrogen fluoride per ml.). Stir the solution at room temperature for 72 hours; then pour into cold aqueous sodium carbonate solution with stirring. Extract with methylene chloride and wash the combined extracts with water, then dry over sodium sulfate, filter, and treat with decolorizing carbon. Concentrate the purified methylene chloride solution to a residue in vacuo. Triturate the resultant residue with ether to give 6α,11β-difluoro-9α - chloro-16β-acetoxymethyl-D-nor-4-androstene-3-one. Purify by crystallization from acetone-hexane.

In a similar manner, 16β-acetoxymethyl-D-nor-4,9(11)-androstadiene-3-one and 6α-methyl-16β-acetoxymethyl-D-nor-4,9(11)-androstadiene-3-one are each reacted with hydrogen fluoride and N-chlorosuccinimide in the above-described manner to give, respectively, 9α-chloro-11β-fluoro-16β-acetoxymethyl-D-nor-4-androstene-3-one and 6α-methyl-9α-chloro-11β-fluoro-16β-acetoxymethyl-D-nor-4-androstene-3-one.

EXAMPLE 17

*9α,11β-dihalogeno-16β-acetoxymethyl-D-nor-1,4-androstadiene-3-one*

A. To a solution of 200 mg. of 9α,11β-dichloro-16β-acetoxymethyl-D-nor-4-androstene-3-one in 5 ml. of dioxane add 115 mg. of dichlorodicyano benzoquinone. Reflux the mixture for 24 hours; then filter off the precipitated hydroquinone. Dilute the solution with methylene chloride, and wash with 1% alkali solution and then water. Dry over sodium sulfate; then concentrate to a residue substantially of 9α,11β - dichloro - 16β - acetoxymethyl-D-nor-1,5-androstadiene-3-one. Purify by crystallization from acetone-hexane.

B. Alternatively, 9α,11β-dichloro - 16β - acetoxymethyl-D-nor-4-androstene-3-one may be subjected to the action of a culture of *Bacillus sphaericus* according to the procedure of Example 4A and the resultant product isolated in the described manner to give 9α,11β-dichloro-16β-acetoxymethyl-D-nor-1,4-androstadiene-3-one.

In a similar manner, by following either procedure A or B of this example, 6α-fluoro-9α,11β-dichloro-16β-acetoxymethyl-D-nor-4-androstene-3-one, 6α-methyl-9α,11β-dichloro - 16β - acetoxymethyl - D - nor - 4 - androstene - 3 - one, 9α - bromo - 11β - fluoro - 16β - acetoxymethyl-D - nor - 4 - androstene - 3 - one, 6α,11β - difluoro - 9α-bromo - 16β - acetoxymethyl - D - nor - 4 - androstene - 3-one, 6α - methyl - 9α - bromo - 11β - fluoro - 16β - acetoxymethyl - D - nor - 4 - androstene - 3 - one, 9α - chloro - 11β - fluoro - 16β - acetoxymethyl - D - nor - 4 - androstene - 3 - one, 6α,11β - difluoro - 9α - chloro- 16β-acetoxymethyl - D - nor - 4 - androstene - 3 - one, and 6α-methyl- 9α - chloro - 11β - fluoro - 16β - acetoxymethyl-D-nor-4-androstene-3-one are each converted to the corresponding 1-dehydro analog, i.e., 6α-fluoro-9α,11β-dichloro - 16β - acetoxymethyl - D - nor - 1,4 - androstadiene - 3 - one, 6α - methyl - 9α,11β - dichloro - 16β - acetoxymethyl - D - nor - 1,4 - androstadiene - 3 - one, 9α-bromo-11β - fluoro - 16β - acetoxymethyl - D - nor - 1,4-androstadiene - 3 - one, 6α,11β - difluoro - 9α - bromo-16β - acetoxymethyl - D - nor - 1,4 - androstadiene - 3-one, 6α - methyl - 9α - bromo - 11β - fluoro - 16β - acetoxymethyl - D - nor - 1,4-androstadiene - 3 - one, 9α - chloro - 11β - fluoro - 16β - acetoxymethyl - D - nor - 1,4-androstadiene - 3 - one, 6α,11β - difluoro - 9α - chloro-16β - acetoxymethyl - D - nor - 1,4 - androstadiene - 3-one, and 6α - methyl - 9α - chloro - 11β - fluoro - 16β-acetoxymethyl-D-nor-1,4-androstadiene-3-one.

EXAMPLE 18

*9α,11β-dihalogeno-16β-hydroxymethyl-D-nor-4-androstene-3-one and the 1-dehydro analogs thereof*

Heat under reflux for thirty minutes a solution of 1 g. of 9α,11β - dichloro - 16β - acetoxymethyl - D - nor - 4-androstene-3-one in 20 ml. of a 5% solution of potassium hydroxide in 95% aqueous methanol. Chill the solution, pour into ice water, then filter, wash and dry the resultant precipitate substantially of 9α,11β-dicholoro-16β-hydroxymethyl-D-nor-4-androstene-3-one. Purify by crystallization from acetone-hexane.

In a similar manner, the 9α,11β-dihalogeno-16β-acetoxymethyl-D-nor-4-androstenes and their 1-dehydro analogs, prepared as described in Examples 14–17, are each hydrolyzed with methanolic potassium hydroxide in the above-described manner to give, respectively, 6α-fluoro-9α,11β - dichloro - 16β-hydroxymethyl - D - nor - 4 - androstene - 3 - one, 6α - methyl - 9α,11β - dichloro - 16β-hydroxymethyl - D - nor - 4 - androstene - 3 - one, 9α,11β-dichloro - 16β - hydroxymethyl - D - nor - 1,4 - androstadiene - 3 - one, 6α - fluoro - 9α,11β - dichloro - 16β - hydroxymethyl - D - nor 1,4 - androstadiene - 3 - one, 6α-methyl - 9α,11β - dichloro - 16β - hydroxymethyl - D - nor-1,4 - androstadiene - 3 - one - 9α - bromo - 11β - fluoro-16β - hydroxymethyl - D - nor - 4 - androstene - 3 - one, 6α,11β - difluoro - 9α - bromo - 16β - hydroxymethyl - D-nor - 4 - androstene - 3 - one, 6α - methyl - 9α - bromo-11β - fluoro - 16β - hydroxymethyl - D - nor - 4 - androstene - 3 - one, 9α - bromo - 11β - fluoro - 16β - hydroxymethyl - D - nor - 1,4 - androstadiene - 3 - one, 6α,11β-difluoro - 9α - bromo - 16β - hydroxymethyl - D - nor - 1,4-androstadiene - 3 - one, 6α - methyl - 9α - bromo - 11β-fluoro - 16β - hydroxymethyl - D - nor - 1,4 - androstadiene - 3 - one, 9α - chloro - 11β - fluoro - 16β - hydroxymethyl - D - nor - 4 - androstene - 3 - one, 6α,11β - difluoro - 9α - chloro - 16β - hydroxymethyl - D - nor - 4- androstene - 3 - one, 6α - methyl - 9α - chloro - 11β - fluoro - 16β - hydroxymethyl - D - nor - 4 - androstene - 3-one, 9α - chloro - 11β - fluoro - 16β - hydroxymethyl - D-nor - 1,4 - androstadiene - 3 - one, 6α,11β - difluoro - 9α-chloro - 16β - hydroxymethyl - D- nor - 1,4 - androstadiene - 3 - one, and 6α - methyl - 9α - chloro - 11β - fluoro-16β - hydroxymethyl - D - nor - 1,4 - androstadiene - 3-one.

EXAMPLE 19

*9α,11β-dihalogeno-16β-acyloxymethyl-D-nor-4-androstene-3-one and derivatives thereof*

Allow 9α,11β-dichloro-16β-hydroxymethyl-D-nor-4-androstene-3-one to react with propionic anhydride in pyridine in a manner similar to that described in Example 3. Isolate the resultant product in the described manner to give 9α,11β - dichloro - 16β - propionyloxymethyl - D-nor - 4 - androstene - 3 - one (9α,11β - dichloro - 16β - hydroxymethyl - D - nor - 4 - androstene - 3 - one propionate).

In a similar manner, by substituting acetic anhydride, valeric anhydride, or benzoyl chloride for propionic anhydride there is obtained, respectively, 9α,11β-dichloro-16β - hydroxymethyl - D - nor - 4 - androstene - 3 - one acetate, 9α,11β - dichloro - 16β - hydroxymethyl - D - nor - 4 - androstene - 3 - one valerate, and 9α,11β - dichloro-16β - hydroxymethyl - D - nor - 4 - androstene - 3 - one benzoate.

In a similar manner, the 9α,11β-dihalogeno-16β-hydroxymethyl-D-nor-4-androstenes and their 1-dehydro analogs prepared as described in Example 18 are each reacted with propionic anhydride in pyridine in the manner of Example 3 and there is obtained their corresponding propionate ester, i.e., 6α-fluoro-9α,11β-dichloro-16β-hydroxymethyl-D-nor-4-androstene-3-one propionate, 6α-methyl - 9α,11β - dichloro-16β-hydroxymethyl-D-nor-4-androstene - 3 - one propionate, 9α,11β-dichloro-16β-hydroxymethyl - D-nor-1,4-androstadiene-3-one propionate, 6α - fluoro - 9α,11β - dichloro - 16β - hydroxymethyl-D-nor - 1,4 - androstadiene-3-one propionate, 6α-methyl-9α,11β - dichloro - 16β - hydroxymethyl - D - nor - 1,4-androstadiene - 3 - one propionate, 9α - bromo - 11β-fluoro - 16β - hydroxymethyl - D - nor - 4 - androstene - 3 - one propionate, 6α,11β - difluoro - 9α - bromo - 16β-hydroxymethyl - D - nor-4-androstene-3-one, propionate, 6α - methyl - 9α - bromo - 11β - fluoro - 16β - hydroxymethyl - D - nor - 4 - androstene - 3 - one propionate, 9α - bromo - 11β - fluoro - 16β - hydroxymethyl - D-nor - 1,4 - androstadiene - 3 - one propionate, 6α,11β-difluoro - 9α - bromo - 16β - hydroxymethyl - D - nor-1,4 - androstadiene - 3 one propionate, 6α - methyl - 9α-bromo - 11β - fluoro - 16β - hydroxymethyl - D - nor-1,4 - androstadiene - 3 - one propionate, 9α - chloro - 11β-fluoro - 16β - hydroxymethyl - D - nor - 4 - androstene - 3 - one propionate, 6α,11β - difluoro - 9α - chloro - 16β-hydroxymethyl - D - nor - 4 - androstene - 3 - one propionate, 6α - methyl - 9α - chloro - 11β -fluoro - 16β - hydroxymethyl - D - nor - 4 - androstene - 3 - one propionate, 9α - chloro - 11β - fluoro - 16β - hydroxymethyl-D - nor - 1,4 - androstadiene 3 - one propionate, 6α,11β-difluoro - 9α - chloro - 16β - hydroxymethyl - D - nor-1,4 - androstadiene - 3 - one, and 6α - methyl-9α - chloro - 11β - fluoro - 16β - hydroxymethyl - D - nor-1,4-androstadiene-3-one propionate.

EXAMPLE 20

*9α-bromo-11β-hydroxy-16β-acetoxymethyl-D-nor-4-androstene-3-one*

To 500 mg. of 16β - acetoxymethyl-D-nor-4,9(11)-androstadiene-3-one (the compound of Example 13) in a mixture of 40 ml. of tetrahydrofuran and 8 ml. of water, cooled in ice, add 250 mg. of N-bromoacetamide followed by 2.5 ml. of 1.5 N perchloric acid. Stir the mixture in the dark for three hours. Then add with stirring a solution of 500 mg. of sodium sulfite in 5 ml. of water, and dilute the mixture with water and extract with methylene chloride. Wash the combined methylene chloride extracts with aqueous sodium bicarbonate, then water, dry over sodium sulfate, and concentrate in vacuo to a residue substantially of 9α-bromo-11β-hydroxy-16β-acetoxymethyl - D - nor-4-androstene-3-one. Purify by crystallization from acetone-hexane.

In a similar manner, 6α-fluoro-16β-acetoxymethyl-D-nor - 4,9(11)-androstadiene-3-one and 6α-methyl-16β-acetoxymethyl - D - nor-4,9(11)-androstadiene-3-one are each reacted with N-bromoacetamide in perchloric acid and the resultant product isolated to give, respectively, 6α-fluoro - 9α - bromo-11β-hydroxy-16β-acetoxymethyl-D-nor - 4 - androstene - 3 - one and 6α - methyl-9α-bromo-11β - hydroxy - 16β-acetoxymethyl-D-nor-4-androstene-3-one.

EXAMPLE 21

*9α-fluoro-11β-hydroxy-16β-acetoxymethyl-D-nor-4-androstene-3-one*

A. 9β,11β-OXIDO-16β-ACETOXYMETHYL-D-NOR-4-ANDROSTENE-3-ONE

To a solution of 300 mg. of 9α-bromo-11β-hydroxy-16β - acetoxymethyl - D - nor - 4 - androstene - 3 - one in 20 ml. of acetone, add 500 mg. of potassium acetate. Heat the mixture at reflux temperature for 16 hours; then pour into ice water. Filter the resultant precipitate of 9β,11β - oxido - 16β - acetoxymethyl-D-nor-4-androstene-3-one and purify by crystallization from acetone-hexane.

In a similar manner, 6α-fluoro-9α-bromo-11β-hydroxy-16β - acetoxymethyl - D-nor-4-androstene-3-one and 6α-methyl - 9α - bromo - 11β - hydroxy - 16β-acetoxymethyl-D-nor-4-androstene-3-one are each reacted with potassium acetate in acetone to obtain, respectively, 6α-fluoro-9β,11β - oxido-16β-acetoxymethyl-D-nor-4-androstene-3-one and 6α - methyl-9β,11β-oxido-16β-acetoxymethyl-D-nor-4-androstene-3-one.

B. 9α-FLUORO-11β-HYDROXY-16β-ACETOXYMETHYL-D-NOR-4-ANDROSTENE-3-ONE

To an ice cold solution of 250 mg. of 9β,11β-oxido-16β-acetoxymethyl-D-nor-4-androstene-3-one in 10 ml. of methylene chloride in a polyethylene bottle, add 1 ml. of 48% aqueous hydrofluoric acid. Stir the mixture vigorously for three hours; then pour into aqueous sodium bicarbonate solution. Separate the organic layer, wash with water, and concentrate to a residue substantially of 9α - fluoro - 11β - hydroxy-16β-acetoxymethyl-D-nor-4-androstene-3-one. Purify by crystallization from acetone-hexane.

In a similar manner, 6α - fluoro - 9β,11β - oxido - 16β-acetoxymethyl-D-nor-4-androstene-3-one and 6α-methyl-8β,11β - oxido - 16β - acetoxymethyl - D - nor - 4 - androstene-3-one are each reacted with aqueous hydrogen fluoride in the above-described manner to give, respectively, 6α-9α-difluoro-11β-hydroxy-16β-acetoxymethyl-D-nor-4-androstene-3-one and 6α-methyl-9α-fluoro-11β-hydroxy-16β-acetoxymethyl-D-nor-4-androstene-3-one.

EXAMPLE 22

*9α-chloro-11β-hydroxy-16β-acetoxymethyl-D-nor-4-androstene-3-one*

To a solution of 100 mg. of 9β,11β-oxido-16β-acetoxymethyl-D-nor-4-androstene-3-one in 20 ml. of chloroform at 0° C. add 2 ml. of a saturated solution of hydrogen chloride in chloroform. Keep the solution at 0° C. for two hours; then wash with sodium acetate solution and water, and concentrate in vacuo to a residue substantially of 9α - chloro - 11β - hydroxy-16β-acetoxymethyl-D-nor-4-androstene-3-one. Purify by crystallization from acetone-hexane.

Similarly, 6α - fluoro-9β,11β-oxido-16β-acetoxymethyl-D-nor-4-androstene-3-one and 6α-methyl-9β,11β-oxido-16β-acetoxymethyl-D-nor-4-androstene-3-one are each reacted with hydrogen chloride in chloroform and the resultant product isolated in the described manner to give, respectively, 6α-fluoro-9α-chloro-11β-hydroxy-16β-acetoxymethyl-D-nor-4-androstene-3-one and 6α-methyl-9α - chloro - 11β - hydroxy - 16β - acetoxymethyl - D-nor-4-androstene-3-one.

EXAMPLE 23

9α-fluoro-11β-hydroxy-16β-acetoxymethyl-D-nor-1,4-androstadiene-3-one

Subject 9α - fluoro-11β-hydroxy-16β-acetoxymethyl-D-nor-4-androstene-3-one to the action of a culture of *Bacillus sphaericus* according to the procedure of Example 4A. Isolate the resultant product in the described manner to give 9α-fluoro-11β-hydroxy-16β-acetoxymethyl-D-nor-1,4-androstadiene-3-one.

In a similar manner, each of the 9α-halogeno-11β-hydroxy - 16β - acetoxymethyl - D - nor - 4 - androstene-3-ones prepared as described in Examples 20–22 are subjected to the action of a culture of *Bacillus sphaericus* to yield, respectively, 9α-bromo-11β-hydroxy-16β-acetoxymethyl-D-nor-1,4-androstadiene-3-one,
6α-fluoro-9α-bromo-11β-hydroxy-16β-acetoxymethyl-D-nor-1,4-androstadiene-3-one,
6α-methyl-9α-bromo-11β-hydroxy-16β-acetoxymethyl-D-nor-1,4-androstadiene-3-one,
6α,9α-difluoro-11β-hydroxy-16β-acetoxymethyl-D-nor-1,4-androstadiene-3-one,
6α-methyl-9α-fluoro-11β-hydroxy-16β-acetoxymethyl-D-nor-1,4-androstadiene-3-one,
9α-chloro-11β-hydroxy-16β-acetoxymethyl-D-nor-1,4-androstadiene-3-one,
6α-fluoro-9α-chloro-11β-hydroxy-16β-acetoxymethyl-D-nor-1,4-androstadiene-3-one and
6α-methyl-9α-chloro-11β-hydroxy-16β-acetoxymethyl-D-nor-1,4-androstadiene-3-one.

EXAMPLE 24

9α-fluoro-16β-acetoxymethyl-D-nor-4-androstene-3,11-dione

To a solution of 250 mg. of 9α-fluoro-11β-hydroxy-16β-acetoxymethyl-D-nor-4-androstene-3-one in 5 ml. of acetone at 5° C., add chromic acid/sulfuric acid reagent until a permanent orange color is observed. Keep the solution at 5° C. for 10 minutes; then add a small quantity of methanol to destroy any excess reagent. Dilute the solution with cold water and filter the precipitate of substantially 9α - fluoro - 16β-acetoxymethyl-D-nor-4-androstene - 3,11 - dione. Purify by crystallization from acetone-hexane.

In a similar manner, each of the 11β-hydroxy-16β-acetoxymethyl-D-nor-androstenes prepared as described in Examples 12 and 20–23 upon reaction with chromic acid/sulfuric acid in the above-described manner yield the corresponding 11-keto derivatives, namely.

16β-acetoxymethyl-D-nor-4-androstene-3,11-dione,
6α-methyl-16β-acetoxymethyl-D-nor-4-androstene-3,11-dione,
6α-fluoro-16β-acetoxymethyl-D-nor-4-androstene-3,11-dione,
9α-bromo-16β-acetoxymethyl-D-nor-4-androstene-3,11-dione,
6α-fluoro-9α-bromo-16β-acetoxymethyl-D-nor-4-androstene-3,11-dione,
6α-methyl-9α-bromo-16β-acetoxymethyl-D-nor-4-androstene-3,11-dione,
9α-fluoro-16β-acetoxymethyl-D-nor-4-androstene-3,11-dione,
6α,9α-difluoro-16β-acetoxymethyl-D-nor-4-androstene-3,11-dione,
6α-methyl-9α-fluoro-16β-acetoxymethyl-D-nor-4-androstene-3,11-dione,
9α-chloro-16β-acetoxymethyl-D-nor-4-androstene-3,11-dione,
6α-fluoro-9α-chloro-16β-acetoxymethyl-D-nor-4-androstene-3,11-dione,
6α-methyl-9α-chloro-16β-acetoxymethyl-D-nor-4-androstene-3,11-dione, and
the 1-dehydro analogs of the foregoing.

EXAMPLE 25

16β-hydroxymethyl-D-nor-4-androstene-3,11-diones

Each of the 16β-acetoxymethyl-D-nor-4-androstene-3,11-diones prepared in Example 24 is hydrolyzed with potassium hydroxide in aqueous methanol according to the procedure of Example 18 to give, respectively, 9α-fluoro - 16β - hydroxymethyl - D - nor-4-androstene-3,11-dione, 16β - hydroxymethyl - D - nor - 4-androstene-3,11-dione, 6α-methyl-16β-hydroxymethyl-D-nor-4-androstene-3,11-dione, 6α-fluoro-16β-hydroxymethyl-D-nor-4-androstene-3,11 - dione, 9α-bromo-16β-hydroxymethyl-D-nor-4 - androstene - 3,11-dione, 6α-fluoro-9α-bromo-16β-hydroxymethyl-D-nor-4-androstene-3,11-dione, 6α-methyl-9α - bromo - 16β-hydroxymethyl-D-nor-4-androstene-3,11-dione, 9α - fluoro - 16β-hydroxymethyl-D-nor-4-androstene - 3,11-dione, 6α,9α-difluoro-16β-hydroxymethyl-D-nor-4-androstene-3,11-dione, 6α-methyl-9α-fluoro-16β-hydroxymethyl-D-nor-4-androstene-3,11-dione, 9α-chloro-16β - hydroxymethyl - D- - nor-4-androstene-3,11-dione, 6α - fluoro - 9α-chloro-16β-hydroxymethyl-D-nor-4-androstene - 3,11 - dione, 6α-methyl-9α-chloro-16β-hydroxymethyl - D - nor - 4 - androstene-3,11-dione, and the 1-dehydro analogs of the foregoing.

EXAMPLE 26

9α,11β-dihalogeno-16β-formyl-D-nor-4-androstene-3-one

Oxidize 9α,11β - dichloro-16β-hydroxymethyl-D-nor-4-androstene-3-one (the compound of Example 18) with aluminumisopropoxide and cyclo hexanone in toluene according to the procedure of Example 8. Isolate the resultant product in the described manner and purify by crystallization from acetone-hexane to give 9α,11β-dichloro-16β-formyl-D-nor-4-androstene-3-one.

In a similar manner, each of the 9α,11β-dihalogeno-16β-hydroxymethyl-D-nor-androstenes prepared as described in Example 18 may be oxidized in the above-described manner to yield the corresponding 16β-formyl derivatives, namely, 6α - fluoro - 9α,11β-dichloro-16β-formyl - D - nor - 4-androstene-3-one, 6α-methyl-9α,11β-dichloro - 16β-formyl-D-nor-4-androstene-3-one, 9α,11β-dichloro - 16β-formyl-D-nor-1,4-androstadiene-3-one, 6α-fluoro - 9α,11β-dichloro-16β-formyl-D-nor-1,4-androstadiene - 3-one, 6α-methyl-9α,11β-dichloro-16β-formyl-D-nor-1,4 - androstadiene-3-one, 9α-bromo-11β-fluoro-16β-formyl - D-nor-4-androstene-3-one, 6α11β-difluoro-9α-bromo-16β-formyl-D-nor-4-androstene-3-one, 6α-methyl-9α-bromo - 11β-fluoro-16β-formyl-D-nor-4-androstene-3-one, 9α-bromo - 11β - fluoro-16β-formyl-D-nor-1,4-androstadiene-3 - one, 6α,11β-difluoro-9α-bromo-16β-formyl-D-nor-1,4-androstadiene - 3 - one, 6α-methyl-9α-bromo-11β-fluoro-16β - formyl - D-nor-1,4-androstadiene-3-one, 9α-chloro-11β - fluoro - 16β-formyl-D-nor-4-androstene-3-one, 6α, 11β - difluoro - 9α-chloro-16β-formyl-D-nor-4-androstene-3-one, 6α-methyl - 9α-chloro - 11β - fluoro-16β-formyl-D-nor-4-androstene3-one, 9α-chloro-11β-fluoro-16β-formyl-D-nor-1,4-androstadiene-3-one, 6α,11β-difluoro-9α-chloro-16β - formyl - D-nor-1,4-androstadiene-3-one, and 6α-methyl - 9α - chloro-11β-fluoro-16β-formyl-D-nor-1,4-androstadiene-3-one.

EXAMPLE 27

16β-formyl-D-nor-4-androstene-3,11-diones

A. 16β-TOSYLOXYMETHYL-D-NOR-4-ANDROSTENE-3,11-DIONES

To a solution of 300 mg. of 9α-fluoro-16β-hydroxymethyl-D-nor-4-androstene-3,11-dione (prepared as described in Example 25) in 5 ml. of dry pyridine at 0° C., add 300 mg. of p-toluenesulfonyl chloride and keep the mixture in a refrigerator for 48 hours. Pour the reaction mixture into ice water and filter the resultant precipitate yielding 9α-fluoro-16β-tosyloxymethyl-D-nor-4-androstene-3,11-dione.

In a similar manner, each of the 16β-hydroxymethyl-D-nor-4-androstene-3,11-diones prepared as described in Example 25, upon reaction with p-toluenesulfonyl chloride in pyridine in the above-described manner, is converted to the corresponding 16β-tosyloxymethyl derivative, namely, 16β-tosyloxymethyl-D-nor-4-androstene-3,11-dione, 6α-methyl-16β-tosyloxymethyl-D-nor-4-androstene-3,11-dione, 6α-fluoro-16β-tosyloxymethyl-D-nor-4-androstene-3,11-dione, 9α-bromo-16β-tosyloxymethyl-D-nor-4-androstene - 3,11 - dione, 6α-fluoro-9α-bromo-16β-tosyloxymethyl - D - nor-4-androstene-3,11-dione, 6α-methyl-9α - bromo - 16β-tosyloxymethyl-D-nor-4-androstene-3,11-dione, 9α-fluoro-16β-tosyloxymethyl-D-nor-4-androstene-3,11 - dione, 6α,9α-difluoro-16β-tosyloxymethyl-D-nor-4-androstene - 3,11 - dione, 6α-methyl-9α-fluoro-16β-tosyloxymethyl - D - nor-4-androstene-3,11-dione, 9α-chloro-16β - tosyloxymethyl - D - nor - 4-androstene-3,11-dione, 6α - fluoro-9α-chloro-16β-tosyloxymethyl-D-nor-4-androstene-3,11-dione, 6α-methyl - 9α - chloro - 16β-tosyloxymethyl-D-nor-4-androstene-3,11-dione, and the 1-dehydro analogs of the foregoing.

B. 16β-FORMYL-D-NOR-4-ANDROSTENE-3,11-DIONES

Add 200 mg. of 9α-fluoro-16β-tosyloxymethyl-D-nor-4-androstene-3,11-dione to a mixture of 400 mg. of sodium bicarbonate and 5 ml. of dimethylsulfoxide heated to 150° C. through which nitrogen is bubbling. Heat the mixture at 150° C. for three minutes; then cool and dilute with water. Filter the precipitate which forms and purify by crystallization from acetone-hexane to give 9α-fluoro-16β-formyl-D-nor-androstene-3,11-dione.

In a similar manner, each of the 16β-tosyloxymethyl derivatives prepared as described in the second paragraph of Example 27A, upon reaction with sodium bicarbonate and dimethyl-sulfoxide as described above, will form the corresponding 16β-formyl derivatives, namely, 16β-formyl-D-nor-4-androstene-3,11-dione,
6α-methyl-16β-formyl-D-nor-4-androstene-3,11-dione,
6α-fluoro-16β-formyl-D-nor-4-androstene-3,11-dione,
9α-bromo-16β-formyl-D-nor-4-androstene-3,11-dione,
6α-fluoro-9α-bromo-16β-formyl-D-nor-4-androstene-3,11-dione,
6α-methyl-9α-bromo-16β-formyl-D-nor-4-androstene-3,11-dione,
9α-fluoro-16β-formyl-D-nor-4-androstene-3,11-dione,
6α,9α-difluoro-16β-formyl-D-nor-4-androstene-3,11-dione,
6α-methyl-9α-fluoro-16β-formyl-D-nor-4-androstene-3,11-dione,
9α-chloro-16β-formyl-D-nor-4-androstene-3,11-dione,
6α-fluoro-9α-chloro-16β-formyl-D-nor-4-androstene-3,11-dione,
6α-methyl-9α-chloro-16β-formyl-D-nor-4-androstene-3,11-dione, and the 1-dehydro analogs of the foregoing, namely, 9α-fluoro-16β-formyl-D-nor-1,4-androstadiene-3,11-dione,
16β-formyl-D-nor-1,4-androstadiene-3,11-dione,
6α-methyl-16β-formyl-D-nor-1,4-androstadiene-3,11-dione,
6α-fluoro-16β-formyl-D-nor-1,4-androstadiene-3,11-dione,
9α-bromo-16β-formyl-D-nor-1,4-androstadiene-3,11-dione,
6α-fluoro-9α-bromo-16β-formyl-D-nor-1,4-androstadiene-3,11-dione,
6α-methyl-9α-bromo-16β-formyl-D-nor-1,4-androstadiene-3,11-dione,
9α-fluoro-16β-formyl-D-nor-1,4-androstadiene-3,11-dione,
6α,9α-difluoro-16β-formyl-D-nor-1,4-androstadiene-3,11-dione,
6α-methyl-9α-fluoro-16β-formyl-D-nor-1,4-androstadiene-3,11-dione,
9α-chloro-16β-formyl-D-nor-1,4-androstadiene-3,11-dione,
6α-fluoro-9α-chloro-16β-formyl-D-nor-1,4-androstadiene-3,11-dione, and
6α-methyl-9α-chloro-16β-formyl-D-nor-1,4-androstadiene-3,11-dione.

EXAMPLE 28

*D-nor-5-pregnene-3β,21-diol-20-one diacetate*

A. D-NOR-5-ANDROSTENE-3β-OL-16β-CARBOXYLIC ACID CHLORIDE 3-ACETATE

To 3 g. of D-nor-5-androstene-3β-ol-16β-carboxylic acid 3-acetate in 25 ml. of anhydrous benzene add 2.5 ml. of oxalyl chloride and heat the mixture under reflux for one hour. Distill the benzene in vacuo under anhydrous conditions. The resultant residue of substantially D-nor-5-androstene-3β-ol-16β-carboxylic acid chloride 3-acetate is used without further purification in the procedure immediately following.

B. 21-DIAZO-D-NOR-5-PREGNENE-3β-OL-20-ONE 3-ACETATE

To a solution of 1 g. of D-nor-5-androstene-3β-ol-16β-carboxylic acid chloride 3-acetate (prepared as described in Example 28A) in 25 ml. of benzene add a solution of diazomethane in ether until a persistent yellow color is obtained. Allow the mixture to stand at room temperature for 30 minutes, then concentrate under reduced pressure to a residue of 21-diazo-D-nor-5-pregnene-3β-ol-20-one 3-acetate. Purify by crystallization from ether-hexane.

C. D-NOR-5-PREGNENE-3β,21-DIOL-20-ONE DIACETATE

Add 1 g. of 21-diazo-D-nor-5-pregnene-3β-ol-20-one 3-acetate to 60 ml. of acetic acid at reflux temperature. Allow the reaction mixture to reflux for three minutes, then distill the acetic acid mixture in vacuo. Triturate the resultant residue with ether and filter off the solid comprising D - nor-5-pregnene-3β,21-diol-20-one diacetate. Purify by crystallization from acetone-hexane. M.P. 143–144.5° C., $[\alpha]_D^{25}$+30.9° (dioxane).

EXAMPLE 29

*D-nor-5-pregnene-3β,20,21-triol*

To a suspension of 3.3 g. of lithium aluminum hydride in 150 ml. of tetrahydrofuran (which has been distilled over calcium hydride) under a blanket of nitrogen, add dropwise with stirring a solution of 3.3 g. of D-nor-5-pregnene-3β,21-diol-20-one diacetate in 140 ml. of tetrahydrofuran (freshly distilled over calcium hydride). Stir the reaction mixture under a nitrogen atmosphere at reflux temperature for 3½ hours, then cool to room temperature. Cautiously add about 30 ml. of ethyl acetate followed by about 40 ml. of a saturated aqueous solution of sodium sulfate. Filter off the solid and wash the filter cake with tetrahydrofuran. Add the tetrahydrofuran washes to the original reaction solution and concentrate in vacuo to a residue comprising D-nor-5-pregnene-3β,20,21-triol. Purify by crystallization from acetone. M.P. 196–200° C. $[\alpha]_D^{25}$−25.5° (dioxane).

EXAMPLE 30

*16β-formyl-D-nor-4-androstene-3-one*

A. 16β-FORMYL-D-NOR-5-ANDROSTENE-3β-OL DIMETHYL ACETAL

To a solution of 780 mg. of D-nor-5-pregnene-3β,20,21-triol in 78 ml. of methanol at room temperature, add a solution of 1.25 g. of meta-periodic acid in 9.4 ml. of water. Allow the reaction mixture to stand overnight at room temperature, then pour into ice water and filter the solid which separates. Wash well with water and dry in a vacuum oven at room temperature overnight. Purify by crystallization from methanol-water containing a drop of pyridine to give 16β-formyl-D-nor-5-androstene-3β-ol dimethyl acetal. M.P. 132–137° C. $[\alpha]_D^{25}$−9.1° (dioxane).

B. 16β-FORMYL-D-NOR-5-ANDROSTENE-3-ONE DIMETHYL ACETAL

To a solution of 100 mg. of 16β-formyl-D-nor-5-androstene-3β-ol dimethyl acetal in 6 ml. of acetone cooled to 0° C., add a chromium trioxide/sulfuric oxide solution dropwise until the reaction mixture remains orange in color for one minute. Add methanol (about 0.2 ml.) followed by water and filter the resultant solid of substantially 16β-formyl-D-nor-5-androstene-3-one dimethyl acetal. Dry in a vacuum oven at room temperature and use without further purification in the procedure immediately following.

C. 16β-FORMYL-D-NOR-4-ANDROSTENE-3-ONE

Dissolve the 16β-formyl-D-nor-5-androstene-3-one dimethyl acetal prepared in the above procedure 30B in 1.3 ml. of acetone. Add two drops of 3 N hydrochloric acid and allow the reaction mixture to stand at room temperature for one hour. Then pour into ice water and filter the resultant solid comprising 16β-formyl-D-nor-4-androstene-3-one. Dry in a vacuum oven at room temperature.

EXAMPLE 31

*D-nor-4-androstene-3-one-16β-carboxylic acid*

A. 16-DIAZO-4-ANDROSTENE-3,17-DIONE

Subject 16-diazo-5-androstene-3β-ol-17-one 3-acetate (the compound of Example 1C) to the action of a culture of *Flavobacterium dehydrogenans* (Rutgers Collection No. 130) as follows:

The culture of the organism is prepared by propagating it in a nutrient agar medium at 30° C. for 24 to 72 hours. During incubation, the inoculated tube is exposed to light with the resultant development of a yellow pigment characteristic of the species. The developed culture is rinsed from an agar slant under sterile conditions into a sterile medium of pH 6.8 and having the following composition:

| | |
|---|---|
| Yeast extract (Difco) | gm 10 |
| Potassium phosphate monobasic | gm 4.48 |
| Sodium phosphate dibasic | gm 4.68 |
| Tap water to 1 liter. | |

This culture medium has previously been autoclaved, at 15 lb. pressure, for twenty minutes to obtain aseptic conditions, and cooled. The variant is grown in the medium under constant illumination, using the visible range of the spectrum. The incubation temperature is maintained at about 33° C. and is conducted under aerobic conditions. Aeration is accomplished by agitation and/or blowing air through the culture medium.

After the organism has grown for 12 to 24 hours (or longer, if desired), 100 ml. of the growing culture are introduced into each of ten flasks, and to each flask are added 200 mg. of 16-diazo-5-androstene-3β-ol-17-one 3-acetate dissolved in a minimum volume of ethanol. The reaction mixtures are then shaken at 30° C. for 12 to 72 hours. The reaction is stopped when paper chromatography indicates that there is no more starting material.

The contents of the flasks are combined and extracted with methylene chloride. The extracts are concentrated and the residue is crystallized from acetone-hexane yielding 16-diazo-4-androstene-3,17-dione.

B. D-NOR-4-ANDROSTENE-3-ONE-16β-CARBOXYLIC ACID

Irradiate a solution of 5 g. of 16-diazo-4-androstene-3,17-dione in 5 ml. of aqueous dioxane for 4 hours with a 200 watt mercury lamp provided with a Corax sleeve. Remove the solvent under reduced pressure and triturate the resultant residue with water and dry giving D-nor-4-androstene-3-one-16β-carboxylic acid. Purify by crystallization from acetone.

EXAMPLE 32

*16β-formyl-D-nor-4-androstene-3-one*

A. D-NOR-4-PREGNENE-20,21-DIOL-3-ONE

The requisite intermediate, i.e. D-nor-4-pregnene-21-ol-3,20-dione 21-acetate is prepared from D-nor-4-androstene-3-one-16β-carboxylic acid via a sequence of reactions similar to those in Example 28 whereby D-nor-4-androstene-3-one-16β-carboxylic acid is reacted with oxalyl chloride as described in Example 28A to give D-nor-4-androstene-3-one-16β-carboxylic acid chloride which, in turn, is treated with diazomethane in ether in the manner of Example 28B to give 21-diazo-D-nor-4-pregnene-3,20-dione. Treatment of 21-diazo-D-nor-4-pregnene-3,20-dione with acetic acid in the manner of Example 28C yields the desired intermediate i.e. D-nor-4-pregnene-3,20-dione-21-ol acetate.

To a stirred slurry of 300 mg. of lithium aluminum hydride in 9 ml. of freshly distilled tetrahydrofuran add dropwise a solution of 200 mg. of D-nor-4-pregnene-21-ol-3,20-dione 21-acetate in 8 ml. of tetrahydrofuran. After the addition, heat the mixture under reflux for 3½ hours, then cool and add 2 ml. of ethyl acetate dropwise, followed by 3 ml. of a saturated aqueous solution of sodium sulfate. Add some solid sodium sulfate and filter the mixture. Concentrate the filtrate to a solid residue of substantially D-nor-4-pregnene - 3,20,21 - triol. An infrared spectrum shows the absence of carbonyl absorption.

Dissolve the above crude triol in 25 ml. of chloroform, and add one gram of powdered activated manganese dioxide. Stir the mixture at room temperature for 8 hours, then filter and concentrate the filtrate to a residue which is crystallized from acetone-isopropyl ether to give D-nor-4-pregnene-20,21-diol-3-one.

B. 16β-FORMYL-D-NOR-4-ANDROSTENE-3-ONE 16-DIMETHYL ACETAL

To a solution of 60 mg. of D-nor-4-pregnene-20,21-diol-3-one in 6 ml. of methanol, add a solution of 90 mg. periodic acid in 0.9 ml. of water and stir the mixture at room temperature for 16 hours. Pour the mixture into water and filter the resulting precipitate, wash with water, and dry. Purify by crystallization from aqueous methanol containing a drop of pyridine to give 16β-formyl-D-nor-4-androstene-3-one 16-dimethyl acetal.

Alternatively, dry a solution of 250 mg. of aluminum isopropoxide in 15 ml. of benzene by distilling off about 5 ml. of benzene. To this solution add 100 mg. of 16β-formyl-D-nor - 5 - androstene-3β-ol dimethyl acetal (the compound of Example 30B) dissolved in 3 ml. of acetone. Heat the mixture under reflux for 16 hours, then cool, dilute with ether, and wash with a concentrated solution of Rochelle salt containing a little sodium carbonate, followed by washing with water. Concentrate the dried solution to a residue of substantially 16β-formyl-D-nor-4-androstene-3-one 16-dimethyl acetal. Purify by crystallization from aqueous methanol containing a drop of pyridine.

C. 16β-FORMYL-D-NOR-4-ANDROSTENE-3-ONE

To a solution of 200 mg. of 16β-formyl-D-nor-4-androstene-3-one 16-dimethyl acetal in 5 ml. of acetone add 4 drops of 3 N hydrochloric acid and keep the mixture at room temperature for one hour. Pour the mixture into ice water and extract with ether. Combine the ether extracts, and wash with water, dry over magnesium sulfate and concentrate to a residue which is crystallized from acetone-hexane to give 16β-formyl-D-nor-4-androstene-3-one.

Alternatively, to a solution of 500 mg. of 16β-hydroxymethyl-D-nor-5-androstene-3β-ol (the compound of Example 2A) in 30 ml. acetone, cooled to about 5°, add 0.90 ml. of chromic-sulfuric acid reagent (266 mg. $CrO_3$/ml.) and stir the mixture at 5–10° C. for 5 min. Dilute the mixture with water and filter the resulting precipitate comprising 16β-formyl-D-nor-5-androstene-3-one. Dissolve the precipitate in acetone and treat with hydrochloric acid as described in the first paragraph of this example to give 16β-formyl-D-nor-4-androstene-3-one.

EXAMPLE 33

*16β-acetoxymethyl-D-nor-5(10)-estrene-3-one*

A. 16β-ACETOXYMETHYL-3-METHOXY-D-NOR-2,5(10)-ESTRADIENE

Esterify 3-methoxy-16β-hydroxymethyl-D-nor-2,5(10)-estradiene (the compound of Example 6A (500 mg.)) with acetic anhydride in pyridine according to the procedure of Example 3, to give 16β-acetoxymethyl-3-methoxy-D-nor-2,5(10)-estradiene.

B. 16β-ACETOXYMETHYL-D-NOR-5(10)-ESTRENE-3-ONE

Hydrolyze 16β-acetoxymethyl - 3 - methoxy-D-nor-2,5-(10)-estradiene (400 mg.) with oxalic acid in aqueous methanol according to the procedure of Example 6B to give 16β-acetoxymethyl-D-nor-5(10)-estrene-3-one.

EXAMPLE 34

*16β-acetoxymethyl-D-nor-5(10)-estrene-3-ols*

To a solution of 400 mg. of 16β-acetoxymethyl-D-nor-5(10)-estrene-3-one in 10 ml. of dimethylformamide add a solution of 50 mg. of sodium borohydride in 2 ml. of water. Stir the mixture at room temperature for 6 hours, then add a few ml. of acetic acid to destroy any excess sodium borohydride. Pour the mixture into ice water and filter the resulting precipitate comprising a mixture of the 3α- and 3β-hydroxy isomers of 16β-acetoxymethyl-D-nor-5(10)-estrene-3-ol. Wash the precipitate with water and dry. Separate the isomers by partition chromatography on Chromosorb W, using the ligroin (B.P. 90–120°)-propylene glycol system, to give 16β-acetoxymethyl-D-nor-5(10)-estrene-3α-ol and 16β-acetoxymethyl-D-nor-5(10)-estrene-3β-ol.

EXAMPLE 35

*16β-acetoxymethyl-3-methoxy-D-nor-5(10)-estrenes*

To a solution of 600 mg. of 16β-acetoxymethyl-D-nor-5(10)-estrene-3β-ol in 25 ml. of diethyl ether (chilled to 0° C.) add with stirring 0.03 ml. of boron trifluoride etherate followed by the addition of an ethereal solution of diazomethane dropwise with stirring at 0° C. until a permanent yellow color is observed. Wash the reaction mixture with aqueous sodium carbonate and with water, dry and concentrate to a residue substantially of 16β-acetoxymethyl - 3β-methoxy-D-nor-5(10)-estrene. Purify by crystallization from ether-pentane.

Similarly, starting with 16β - acetoxymethyl-D-nor-5(10)-estrene-3α-ol and following the above procedure the corresponding 3α-methoxy compound of this example is obtained, i.e. 16β-acetoxymethyl-3α-methoxy-D-nor-5-(10)-estrene.

EXAMPLE 36

*16β-formyl-D-nor-4-androstene-3,11-dione*

In a manner similar to that described in Example 8 treat 16β-hydroxymethyl-D-nor-4-androstene-11β-ol-3-one with aluminum isopropoxide and isolate and purify resultant product in the manner described to obtain 16β-formyl-D-nor-4-androstene-3,11-dione.

In a similar manner, 6α-methyl-16β-hydroxymethyl-D-nor-4-androstene-11β-ol-3-one and 6α-fluoro-16β-hydroxymethyl-D-nor-4-androstene-11β-ol-3-one are each reacted with aluminum isopropoxide and there is obtained respectively 6α-methyl-16β-formyl-D-nor-4-androstene-3,11-dione and 6α-fluoro-16β-formyl-D-nor-4-androstene-3,11-dione.

EXAMPLE 37

*16β-hydroxymethyl-D-nor-1,5-androstadiene-3-One*

Add 7 ml. of an approximately 18% suspension of sodium acetylide in xylene to a solution of 0.8 g. of 16β-hydroxymethyl-D-nor-1,4-androstadiene-3-one in 16 ml. of dimethylsulfoxide. Stir the reaction mixture under an amosphere of nitrogen for 50 minutes, then pour cautiously into ice water. Extract the aqueous mixture with ethyl aceate, combine the extracts and evaporate to a residue of substantially 16β-hydroxymethyl-D-nor-1,5-androstadiene-3-one. Purify by chromatography over 20 g. of Florisil eluting with ether-hexane. Combine like fractions which by ultraviolet evaluation contain the 3-keto-1,5-diene system. Evaporate the combined fractions to a residue and crystalize from acetate-hexane.

In a similar manner, 16β-hydroxymethyl-D-nor-4-androstene-3-one, 6α - fluoro-16β-hydroxymethyl-D-nor-4-androstene-3-one, 6α-methyl-16β-hydroxymethyl-D-nor-4-androstene - 3 - one, 16β-hydroxymethyl-D-nor-19-nor-4-androstene-3-one, 9α,11β-dichloro-16β-hydroxymethyl-D-nor - 4 - androstene-3-one, 9α,11β-dichloro-16β-hydroxymethyl-D-nor-1,4-androstadiene-3-one and the 16-acetate esters thereof are each reacted with sodium acetylide in xylene in the above described manner to obtain, respectively, 16β-hydroxymethyl-D-nor-5-androstene-3-one, 6α-fluoro - 16β - hydroxymethyl - D-nor-5-androstene-3-one, 6α - methyl-16β-hydroxymethyl-D-nor-5-androstene-3-one, 16β - hydroxymethyl-D-nor-19-nor-5-androstene-3-one, 9α,11β - dichloro - 16β-hydroxymethyl-D-nor-1,5-androstadiene-3-one and the respective 16-acetate esters thereof.

EXAMPLE 38

*16β-formyl-D-nor-1,5-androstadiene-3-one*

To a solution of 500 mg. of 16β-hydroxymethyl-D-nor-1,5-androstadiene-3-one in 30 ml. of acetone cooled to about 5° C. add 0.45 ml. of chromic sulfuric reagent (133 mg. $CrO_3$/ml.) and stir the mixture at 5 to 10° C. for 5 minutes. Dilute the mixture with water and filter the resulting precipitate comprising 16β-formyl-D-nor-1,5-androstadiene - 3 - one. Purify by crystallizing from acetone-hexane.

In a similar manner, treat each of 16β-hydroxymethyl-D-nor-5-androstene-3-one, 6α-fluoro-16β-hydroxymethyl-D-nor-5-androstene-3-one, 6α-methyl-16β-hydroxymethyl-D-nor - 5-androstene-3-one, 16β-hydroxymethyl-D-nor-19-nor - 5 - androstene-3-one, 9α,11β-dichloro-16β-hydroxymethyl-D-nor-1,5-androstadiene-3-one with chromic sulfuric reagent in the above described manner. Isolate and purify the resultant product as described to obtain, respectively, 16β - formyl-D-nor-5-androstene-3-one, 6α-fluoro - 16β-formyl-D-nor-5-androstene-3-one, 6α-methyl-16β-formyl-D-nor-5-androstene-3-one, 16β-formyl-D-nor-19 - nor-5-androstene-3-one, 9α,11β-dichloro-16β-formyl-D-nor-1,5-androstadiene-3-one.

EXAMPLE 39

*16β-formyl-D-nor-4-androstene-3-one*

A. D-NOR-4-ANDROSTENE-3-ONE-16β-CARBOXYLIC ACID CHLORIDE

To a solution of 500 mg. of 16β-carboxy-D-nor-4-androstene-3-one in 20 ml. of dry benzene containing 5 drops of pyridine, chilled in ice, add 2 ml. of oxalyl chloride. Stir the mixture at room temperature for one hour under exclusion of moisture, then remove the solvent in vacuo. Add benzene (20 ml.) to the residue, filter, and concentrate the filtrate to a residue comprising substantially D-nor-4-androstene-3-one-16β-carboxylic acid chloride.

B. 16β-FORMYL-D-NOR-4-ANDROSTENE-3-ONE

Dissolve the D-nor-4-androstene-3-one-16β-carboxylic acid chloride prepared in Example 39A in 20 ml. of m-xylene, then add 500 mg. of 5% palladium on barium sulfate catalyst and 0.05 ml. of quinoline-sulfur reagent (Organic Syntheses, vol. III, p. 629 (1955)). Pass hydrogen through the mixture, which is heated under reflux with vigorous stirring, until evolution of hydrogen chloride ceases. Cool the mixture treated with decolorizing charcoal and filter. Concentrate the filtrate to a residue comprising substantially 16β-formyl-D-nor-4-androstene-3-one. Purify by chromatography on Florisil as described in Example 8.

EXAMPLE 40

3-methoxy-16β-formyl-D-nor-2,5(10)-estradiene

Treat 3 - methoxy - 16β - hydroxymethyl - D - nor-2,5(10)-estradiene (the compound of Example 6A) with aluminum isopropoxide in the manner described in Example 8. Isolate and purify the resultant product in the manner described to obtain 3-methoxy-16β-formyl-D-nor-2,5(10)-estradiene.

In a similar manner, 16β-hydroxymethyl-D-nor-5(10)-estrene-3-one (the compound of Example 6B), upon reaction with aluminum isopropoxide in the manner described in Example 8, is converted to 16β-formyl-D-nor-5(10)-estrene-3-one.

What is claimed is:

1. A compound selected from the group consisting of a D-nor-steroid of the following Formulae I–V:

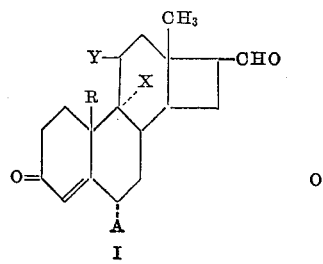
I

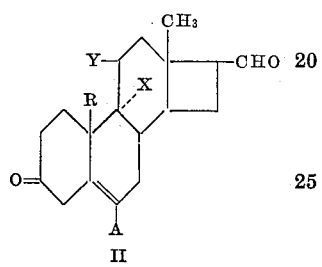
II

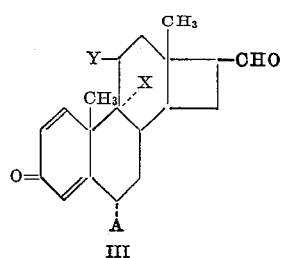
III

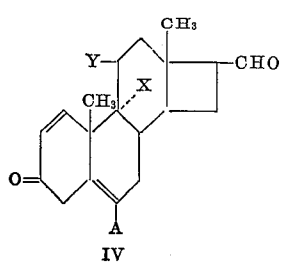
IV and

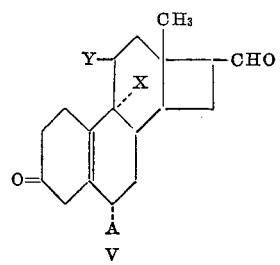
V wherein A is a member selected from the group consisting of hydrogen, lower alkyl, and halogen;

R is a member selected from the group consisting of hydrogen and methyl;

X is a member selected from the group consisting of hydrogen and halogen;

Y is a member selected from the group consisting of hydroxy, lower alkanoyloxy, and keto, hydrogen provided X is hydrogen, and halogen provided X is halogen.

2. A compound selected from the group consisting of a D-nor steroid of the following Formulae I–V:

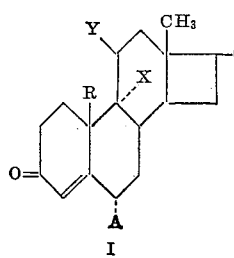
I

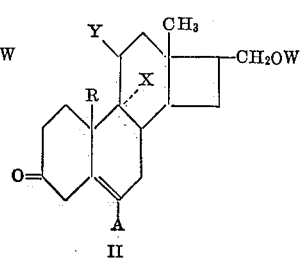
II

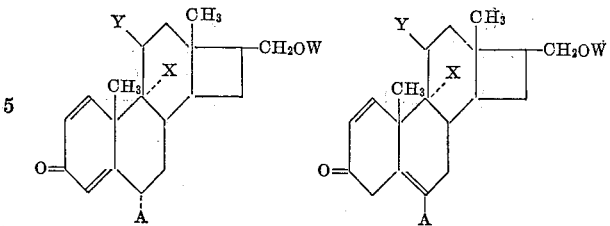
III          IV and

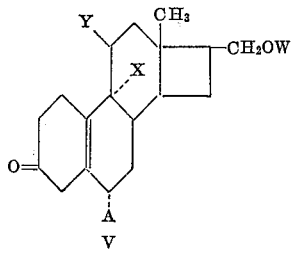
V wherein A is a member selected from the group consisting of hydrogen, lower alkyl, and halogen;

R is a member selected from the group consisting of hydrogen and methyl;

X is a member selected from the group consisting of hydrogen and halogen;

Y is a member selected from the group consisting of hydroxy, lower alkanoyloxy, and keto, hydrogen provided X is hydrogen, and halogen provided X is halogen;

and W is a member selected from the group consisting of hydrogen and an acyl radical of a hydrocarbon carboxylic acid having up to eight carbon atoms.

3. A compound selected from the group consisting of a D-nor steroid of the following Formulae I–X:

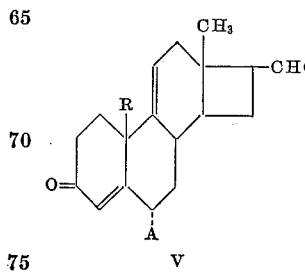
I

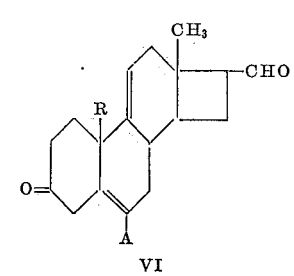
II

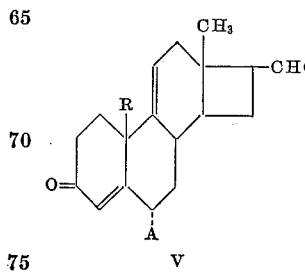
III

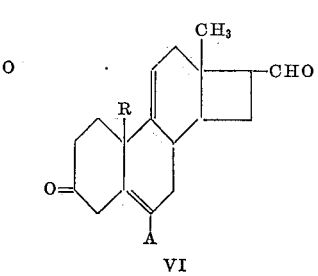
IV

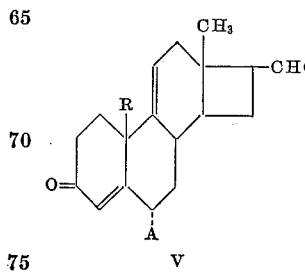
V

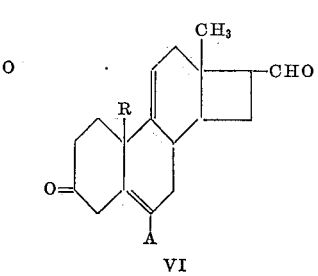
VI

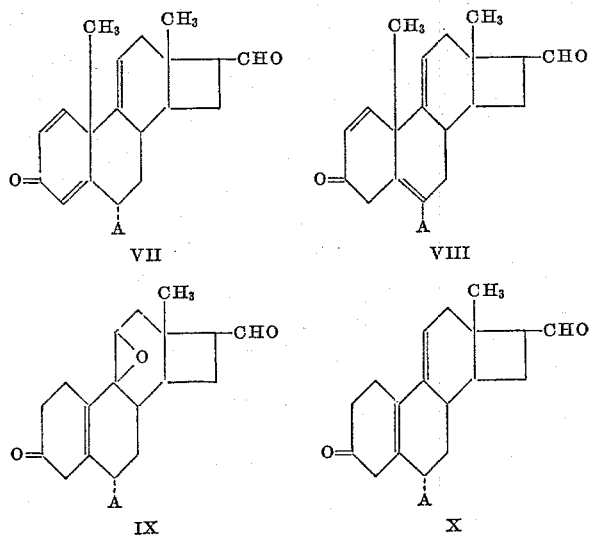

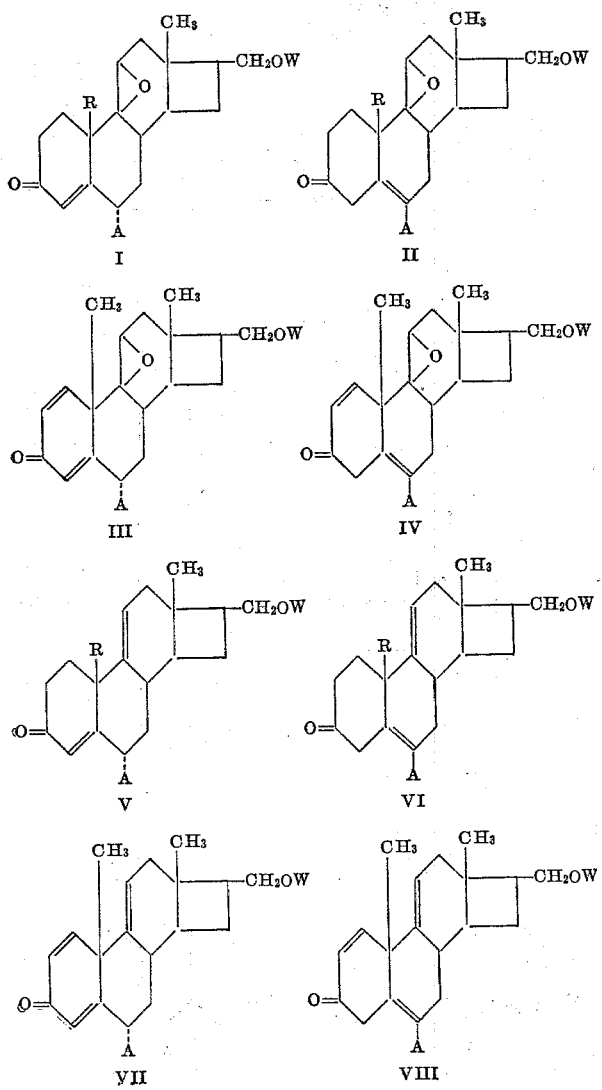

wherein A is a member selected from the group consisting of hydrogen, lower alkyl and halogen, and R is a member selected from the group consisting of hydrogen and methyl.

4. A compound selected from the group consisting of a D-nor steroid of the following Formulae I–X:

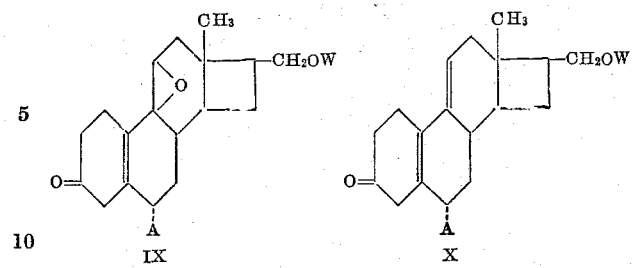

wherein A is a member selected from the group consisting of hydrogen, lower alkyl, and halogen;

R is a member selected from the group consisting of hydrogen and methyl;

and W is a member selected from the group consisting of hydrogen and an acyl radical of a hydrocarbon carboxylic acid having up to eight carbon atoms.

5. A compound selected from the group consisting of a D-nor-steroid of the following Formulae I–VI:

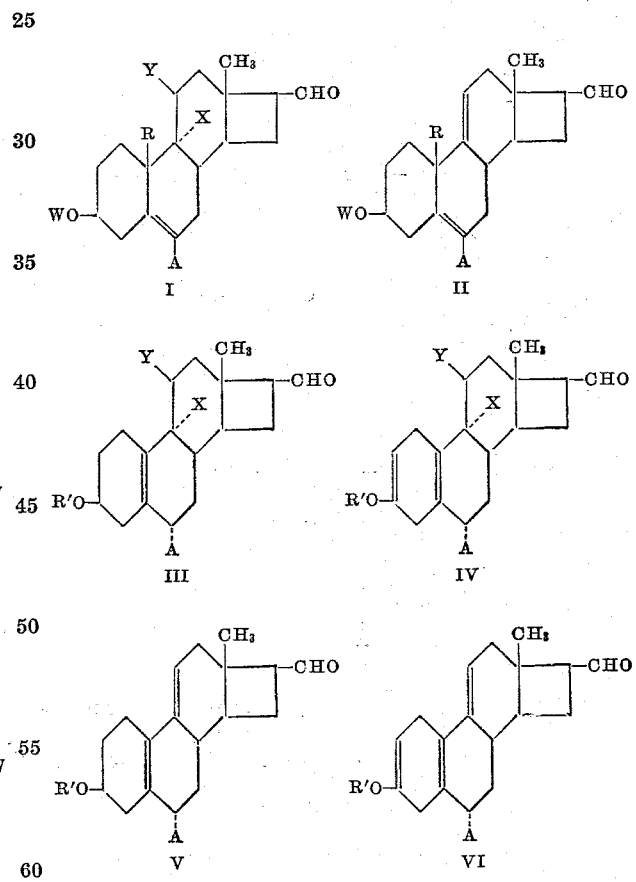

wherein A is a member selected from the group consisting of hydrogen, lower alkyl, and halogen;

R and R' are members selected from the group consisting of hydrogen and methyl;

W is a member selected from the group consisting of hydrogen and an acyl radical of a hydrocarbon carboxylic acid having up to eight carbon atoms;

X is a member selected from the group consisting of hydrogen and halogen;

Y is a member of the group consisting of hydroxy, lower alkanoyloxy, keto, hydrogen provided X is hydrogen, and halogen provided X is halogen;

and together X and Y represent 9β,11β-oxido.

6. A compound selected from the group consisting of a D-nor-steroid of the following Formulae I–VI:

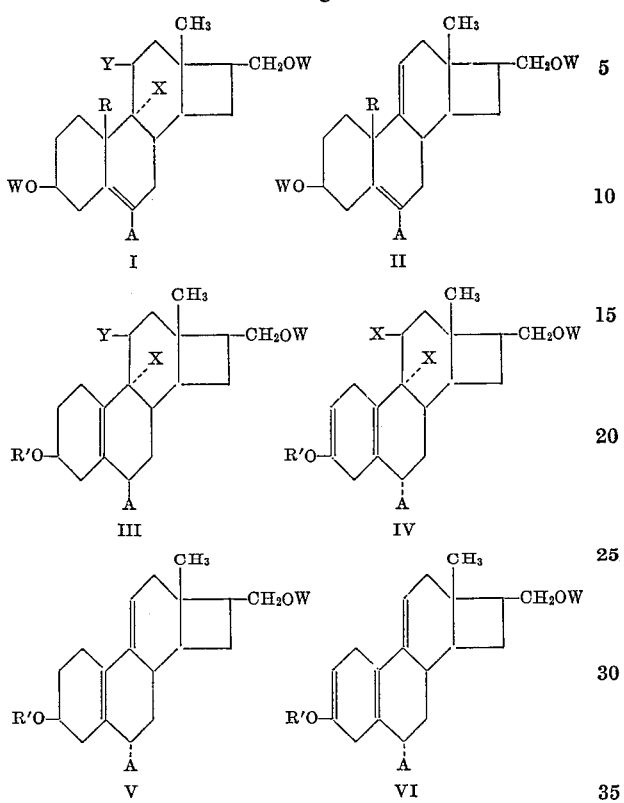

wherein A is a member selected from the group consisting of hydrogen, lower alkyl, and halogen;

R and R' are members selected from the group consisting of hydrogen and methyl;

W is a member selected from the group consisting of hydrogen and an acyl radical of a hydrocarbon carboxylic acid having up to eight carbon atoms;

X is a member selected from the group consisting of hydrogen and halogen;

Y is a member of the group consisting of hydroxy, lower alkanoyloxy, keto, hydrogen provided X is hydrogen, and halogen provided X is halogen;

and together X and Y represent 9β,11β-oxido.

7. A compound selected from the group consisting of a D-nor-steroid of the following Formulae I–IV:

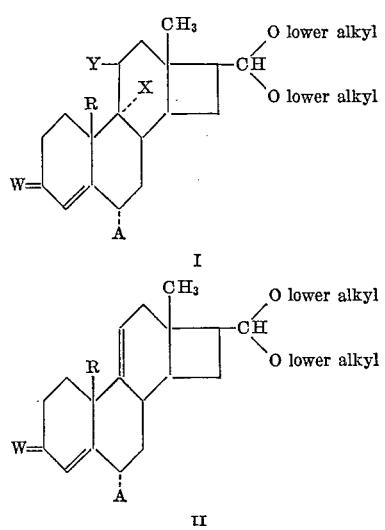

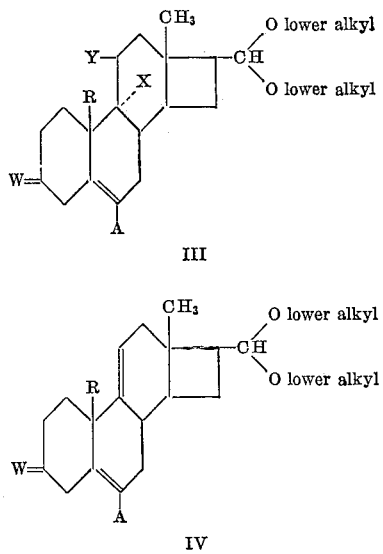

wherein A is a member selected from the group consisting of hydrogen, lower alkyl, and halogen;

R is a member selected from the group consisting of hydrogen and methyl;

W is a member selected from the group consisting of keto and (H, OH);

X is a member selected from the group consisting of hydrogen and halogen;

and Y is a member selected from the group consisting of hydroxy, alkanoyloxy, keto, hydrogen provided X is hydrogen, and halogen provided X is halogen;

and together X and Y represent 9β,11β-oxido.

8. 16β-hydroxymethyl-D-nor-4-androsten-3-one.
9. 16β-hydroxymethyl-D-nor-5-androsten-3β-ol.
10. 16β-formyl-D-nor-4-androsten-3-one.
11. 16β-hydroxymethyl-D-nor-19-nor - 4 - androsten-3-one.
12. 16β-formyl-D-nor-19-nor-4-androsten-3-one.
13. 9α-halogeno-11β-hydroxy - 16β - acetoxymethyl-D-nor-4-androsten-3-one.
14. 16β-formyl-D-nor-5-androsten - 3β - ol dimethylacetal.
15. 16β-formyl-D-nor-4-androsten - 3 - one dimethylacetal.
16. 16β-hydroxymethyl-D-nor - 4 - androstene-3,11-dione.
17. 16β-formyl-D-nor-4-androstene-3,11-dione.
18. 9α-halogeno-16β-acetoxymethyl-D-nor - 4 - androsten-3,11-dione.
19. 16β-hydroxymethyl-D-nor-1,4-androstadien-3-one.
20. 16β-formyl-D-nor-1,4-androstadien-3-one.

References Cited by the Examiner

Reimann et al., Chem. and Industry, Feb. 23, 1963, pp. 334–335.

Cava et al., J. Amer. Chem. Soc., vol. 84, January 1962, pp. 115–116.

Meinwald et al., J. Amer. Chem. Soc., vol. 84, January 1962, pp. 116–117.

Muller et al., Soc. Chim. de France, 1962, pp. 296–298.

LORRAINE A. WEINBERGER, *Primary Examiner.*

V. GARNER, *Assistant Examiner.*